(12) United States Patent
Togami

(10) Patent No.: US 8,373,907 B2
(45) Date of Patent: Feb. 12, 2013

(54) IMAGE PROCESSING APPARATUS INCLUDING A USAGE-LOG MANAGING UNIT FOR MANAGING USAGE LOG INFORMATION ABOUT A PROCESSED IMAGE DATA AND IMAGE PROCESSING METHOD

(75) Inventor: Atsushi Togami, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 770 days.

(21) Appl. No.: 12/546,176

(22) Filed: Aug. 24, 2009

(65) Prior Publication Data

US 2010/0053695 A1    Mar. 4, 2010

(30) Foreign Application Priority Data

Sep. 2, 2008    (JP) .................................. 2008-225131

(51) Int. Cl.
*G06K 15/00* (2006.01)
*H04N 1/40* (2006.01)
*H04N 1/46* (2006.01)
(52) U.S. Cl. .......................... 358/448; 358/1.16; 358/501
(58) Field of Classification Search .......................... None
See application file for complete search history.

(56) References Cited

U.S. PATENT DOCUMENTS

| 6,765,686 B2 * | 7/2004 | Maruoka | 358/1.15 |
| 2006/0245006 A1 * | 11/2006 | Nakata et al. | 358/448 |
| 2007/0035790 A1 * | 2/2007 | Kotani | 358/537 |
| 2009/0195819 A1 * | 8/2009 | Sugimoto et al. | 358/1.15 |

FOREIGN PATENT DOCUMENTS

| JP | 11-55436 A | 2/1999 |
| JP | 2000-331177 | 11/2000 |
| JP | 3895492 | 12/2006 |
| JP | 2007-41808 A | 2/2007 |
| JP | 2008-17394 A | 1/2008 |
| JP | 2008-28550 | 2/2008 |

OTHER PUBLICATIONS

Japanese Office Action issued Sep. 27, 2012 in Patent Application No. 2008-225131.

* cited by examiner

*Primary Examiner* — Twyler Haskins
*Assistant Examiner* — Barbara Reinier
(74) *Attorney, Agent, or Firm* — Oblon, Spivak, McClelland, Maier & Neustadt, L.L.P.

(57) ABSTRACT

An image processing apparatus includes an image receiving unit, an image processing unit, an image storage unit, a usage-log managing unit, an operation display unit, and a control unit. The usage-log managing unit manages processing contents used for image data processed by the image processing unit in association with the processed image data as usage log information. When the operation display unit receives a request for an output process, the control unit acquires a processing content of the output process from the usage log information and displays information about the acquired processing content in association with image data processed based on the acquired processing content via the operation display unit.

14 Claims, 12 Drawing Sheets

IMAGE PROCESSING APPARATUS INCLUDING A USAGE-LOG MANAGING UNIT FOR MANAGING USAGE LOG INFORMATION ABOUT A PROCESSED IMAGE DATA AND IMAGE PROCESSING METHOD

CROSS-REFERENCE TO RELATED APPLICATIONS

The present application claims priority to and incorporates by reference the entire contents of Japanese Patent Application No. 2008-225131 filed in Japan on Sep. 2, 2008.

BACKGROUND OF THE INVENTION

1. Field of the Invention

The present invention relates to a technology for displaying processing contents available to a user who gives instructions for an output process based on usage log information in which processing contents performed on output image data are managed in association with the output image data.

2. Description of the Related Art

An image processing apparatus, such as a multifunction product (MFP) that has copy, fax, scanner, and printer functions, receives data from a scanner unit that scans images of an original and from an external device connected to the MFP on a network via a communication unit. The image processing apparatus then performs a printing process within the MFP by using various types of input data or outputs the data to an external device. An external device connectable to the MFP via a communication unit on a network is, for example, a personal computer (PC), a fax machine, a network printer, or another MFP. Because each device has a different capability or a different processable data format, data to be input or output varies among different devices.

Such an image processing apparatus functions as an element of an image processing system in which an external device is included and, in order to operate effectively in the system, the image processing apparatus is provided with a processing unit that is used to process various types of image data or to output image data with characteristics desired by the user.

In recent years, in order to improve usability, image processing apparatuses are provided with a high-capacity storage device, such as a hard disk drive (HDD) in which input image data can be stored as files, and has a function (often called a document box function) for reusing image data stored in the storage device for a re-output process (a process for outputting data by printing or outputting data to an external device).

In the document box function, because image data obtained by reading (scanning) images of an original contains signal components that depend on characteristics of a scanner during a reading process, the signal components are reduced or removed from the image data so that the image data is normalized. After the image data is converted into universal image data usable by various output processes, the universal image data is stored in the HDD. Because the image data is stored in the HDD in the above manner, the image data can be used flexibly depending on purposes or applications without obtaining image data from the original again.

Japanese Patent Application Laid-open No. 2008-28550, Japanese Patent Application Laid-open No. 2000-331177, and Japanese Patent No. 3895492 disclose image processing apparatuses that have a function for reusing stored image data.

In the image processing apparatus disclosed in Japanese Patent Application Laid-open No. 2008-28550, image data obtained by reading images of an original is converted into standard image data and the standard image data is stored, so that the image data can be sent to a plurality of types of output destinations without manipulating the data. When the stored image data is to be reused, image data obtained by editing the stored image data is previewed, whereby it is possible for a user to check images to be printed out or the image data to be sent to a different output destination.

Japanese Patent Application Laid-open No. 2000-331177 discloses an image editing method in which operations used during an editing process performed on image data are stored in a log. When the edited image data is to be modified in response to a user's request, the operations stored in the log are displayed in the form of a menu. Instead of performing a restore operation or a redo operation during the editing process in a time-series manner, only an operation specified by the user is performed, whereby operability of the editing process is improved.

In the image processing apparatus disclosed in Japanese Patent No. 3895492, a plurality of sets of image data (adjusted image data) generated by changing a plurality of parameters of reference image data are displayed around the reference image data with a predetermined relation based on an amount of change, and desired image data is selected from the sets of the image data; thus, the user can adjust parameters of the image data in an easy and effective manner.

Each technology disclosed in Japanese Patent Application Laid-open No. 2008-28550, Japanese Patent Application Laid-open No. 2000-331177, and Japanese Patent No. 3895492 makes it possible for a user to edit or adjust image data when stored image data is to be reused.

However, when a user specifies processing contents of an editing process to be performed on stored image data, information about the processing contents to be given to the user is limited. Furthermore, if the user is not used to operating the editing process, the user can only specify processing contents within a narrow range of variations.

In Japanese Patent Application Laid-open No. 2008-28550, a user specifies processing contents of an editing process to be performed on stored image data by using a conventional method; therefore, there is little improvement in the user's operations. In Japanese Patent Application Laid-open No. 2000-331177, the technology makes it possible only to modify editing contents performed on stored image data by a user. In Japanese Patent No. 3895492, because the sets of image data generated by changing parameters of target image data to be adjusted are displayed, a user can see the visual effects on the image data as processing results; however, the user only can select appropriately adjusted image data from the sets of displayed image data.

As described above, in the conventional technologies, when the processing performed on the stored image data is displayed, it is possible only to modify the editing contents, change the parameters of the target image data, or change an output destination; therefore, information is displayed within the range of the processing contents used for the stored image data.

Thus, when a user who is not used to operating editing processes desires to perform a new editing process on reusable image data, it is difficult for the user to find a new way of using processing contents other than the ways usually used by the user and to perform operations appropriate for a user's intention.

SUMMARY OF THE INVENTION

It is an object of the present invention to at least partially solve the problems in the conventional technology.

According to an aspect of the present invention, there is provided an image processing apparatus including an image receiving unit configured to receive input image data; an image processing unit configured to process the input image data thereby generating processed image data; an image storage unit configured to store therein the input image data and the processed image data; a usage-log managing unit configured to manage usage log information about the processed image data; an operation display unit that has a graphical user interface (GUI) function and configured to receive an input of a processing request for processing input image data to generate processed image data; and a control unit configured to control each unit of the image processing apparatus, including the image receiving unit, the image processing unit, the image storage unit, the usage-log managing unit, and the operation display unit, thereby controlling the overall image processing apparatus based on the processing request. The usage-log managing unit manages processing contents that have been used by the image processing unit when generating the processed image data in association with the processed image data as the usage log information, and when the operation display unit receives a request for an output process of the processed image data, the control unit acquires a processing content of the output process from the usage log information depending on the output process and displays processing content information about acquired processing content in association with image data processed based on the acquired processing content on the operation display unit.

According to another aspect of the present invention, there is provided an image processing method implemented on an image forming apparatus. The image forming apparatus including an image receiving unit configured to receive input image data; an image processing unit configured to process the input image data thereby generating processed image data; an image storage unit configured to store therein the input image data and the processed image data; a usage-log managing unit configured to manage usage log information about the processed image data; an operation display unit that has a graphical user interface (GUI) function and configured to receive an input of a processing request for processing input image data to generate processed image data; and a control unit configured to control each unit of the image processing apparatus, including the image receiving unit, the image processing unit, the image storage unit, the usage-log managing unit, and the operation display unit, thereby controlling the overall image processing apparatus based on the processing request. The usage-log managing unit manages processing contents that have been used by the image processing unit when generating the processed image data in association with the processed image data as the usage log information. The image processing method including receiving a request for an output process of the processed image data via the operation display unit; acquiring a processing content of the output process from the usage log information depending on the output process; and displaying processing content information about acquired processing content in association with image data processed based on the acquired processing content on the operation display unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. An MFP is given as an example of an image processing apparatus according to an embodiment of the present invention.

The MFP has a document box function as well as copy, fax, printer, and scanner functions. The document box function is used to re-output stored image data. Although the MFP capable of color printing is explained in the embodiment, an MFP capable of only black-and-white printing can be applied to the embodiment.

Figure 1:
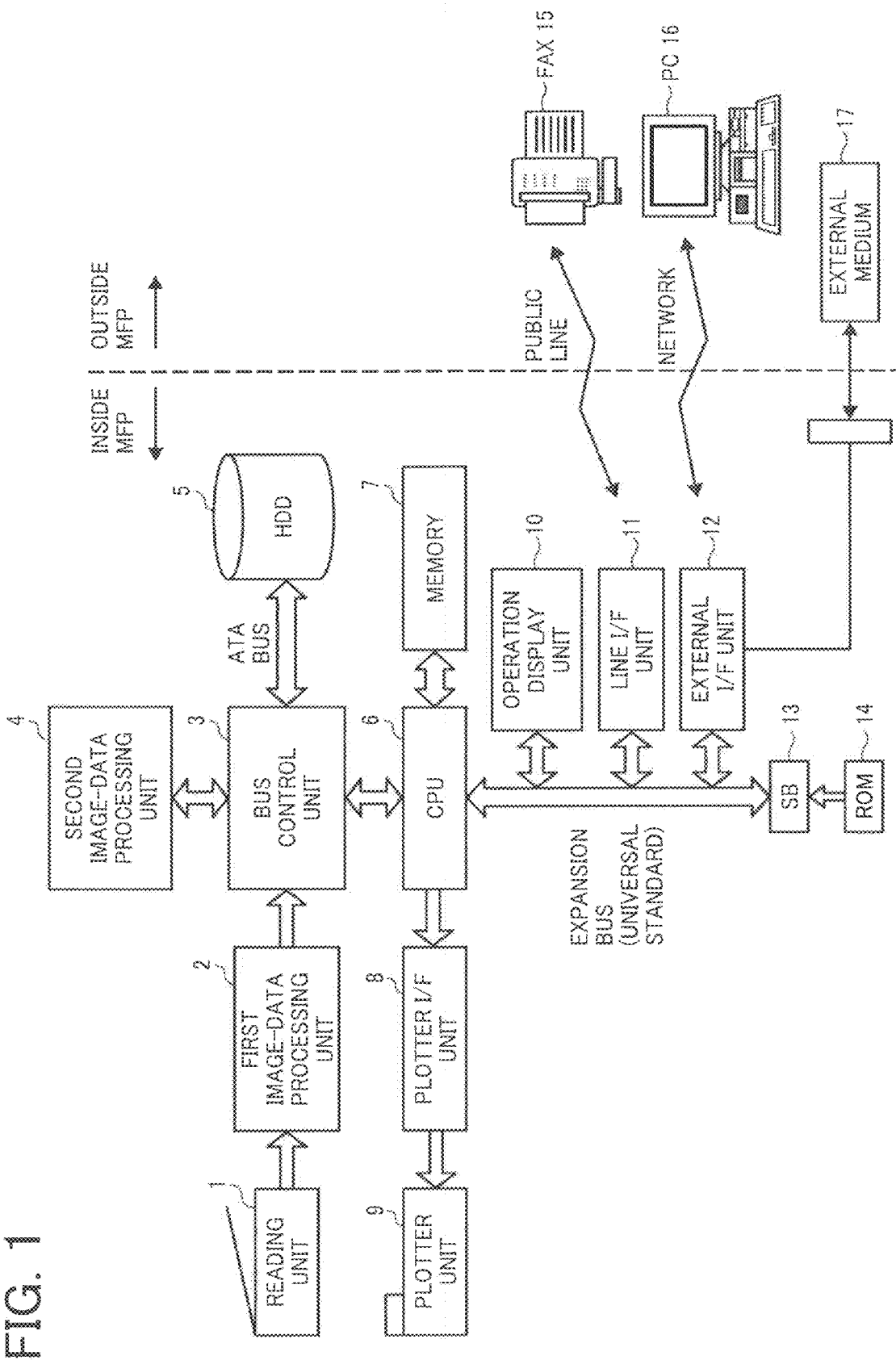
FIG. 1 is a schematic diagram that illustrates a configuration of an image-data processing system including an MFP according to an embodiment of the present invention.

FIG. 1 is a schematic diagram that illustrates a configuration of an image-data processing system including the MFP.

In the image-data processing system, image data is received by a reading unit that reads images of an original or a receiving unit that receives image data with a predetermined format or image data that can be converted into a predetermined format from an external device via a communication unit. The received image data is then processed to be output by printing. Data received from an external device includes scanned data received from a host PC, or the like, print data generated by a printer driver, or data received by a fax machine.

Furthermore, in the image-data processing system, it is possible that received data is stored in a storage unit and the stored data is output by printing after the elapse of time, or the stored data is reused to be output by printing or output (transmitted) to an external device. Because an external device to which data is to be transmitted can be, for example, a PC, fax machine, network printer, or MFP, the data to be transmitted is image data with a predetermined format or image data that can be converted into a predetermined format. Thus, the data can be processed by each of a PC, fax machine, network printer, and MFP.

The MFP includes a reading unit 1 such as a scanner, a first image-data processing unit 2, a bus control unit 3, a second image-data processing unit 4, an HDD 5, a central processing unit (CPU) 6, a memory 7, a plotter interface (I/F) unit 8, a plotter unit 9, an operation display unit 10, a line I/F unit 11, an external I/F unit 12, a south bridge (SB) 13, and a read only memory (ROM) 14. The reading unit 1 includes a line sensor (not shown) that includes a photoelectric conversion element such as a charge-coupled device (CCD), an analog-to-digital (A/D) converter (not shown), and a drive circuit (not shown) that drives the line sensor and the A/D converter. The reading unit 1 scans a set original to obtain density information on images of the original according to red, green, and blue (RGB) colors and generates 8-bit-based RGB digital image data, based on the obtained density information, to be output. It is possible to have the same configuration as that described above by using a contact image sensor (CIS) or a complementary metal oxide semiconductor (CMOS) image sensor instead of the CCD. Because the number of bits to be read has been increasing in recent years, 10-bit-based or 12-bit-based image data can be used.

The first image-data processing unit 2 standardizes a characteristic of the digital image data received from the reading unit 1 to a predetermined characteristic and then outputs the digital image data (see the explanation described later with reference to FIG. 2). Because image data obtained by the scanner depends on the characteristics of the scanner, signal components that depend on the characteristics of the scanner are reduced or removed by the above process, the image data is normalized to be converted into universal data usable by various output processes, and then the universal image data is stored in the HDD 5. Thus, the stored image data is processed as data having characteristics suitable for a request received from an output destination for which the store image data is to be reused.

The bus control unit 3 controls a data bus that transfers various types of data, such as image data or control commands, required in the image-data processing system. The bus control unit 3 has a bridge function to bridge a plurality of types of bus standards. The bus control unit 3 is connected to the first image-data processing unit 2, the second image-data processing unit 4, and the CPU 6 via a Peripheral Component Interconnect (PCI)-Express bus, and is connected to the HDD 5 via an Advanced Technology Attachment (ATA) bus. The bus control unit 3 is implemented as an Application Specific Integrated Circuit (ASIC).

The second image-data processing unit 4 performs adjustment, editing, or image processing suitable for an output destination specified by a user on digital image data processed by the first image-data processing unit 2, image data received via the line I/F unit 11 or the external I/F unit 12, or image data stored in the HDD 5. For example, if image data is to be output to a recording medium such as a sheet, the image data standardized by the first image-data processing unit 2 is converted into image data that depends on the plotter unit 9 corresponding to cyan, magenta, yellow, and black (CMYK) colors. The second image-data processing unit 4 will be explained in detail later with reference to FIG. 5.

The HDD 5 is a large-capacity storage device that stores therein digital image data and image management information such as bibliographic information accompanied with the digital image data. The HDD 5 is connectable via a standardized ATA bus that is an extended version of integrated drive electronics (IDE). A device other than the HDD 5 can be used as the HDD 5, and a silicon disk that uses a flash memory whose capacity has been increasing in recent years can be applied as the HDD 5. In such a case, lower power consumption and higher access speed can be expected.

The CPU 6 is a microprocessor that controls the image-data processing system. The CPU 6 is an integrated CPU in which an optional function is added to a CPU core that has been widely used in recent years. The CPU 6 is integrated with a connect function for connecting to a universal standard I/F and a bus connect function using a crossbar switch.

The memory 7 is a volatile memory. Temporarily used data is stored in the memory 7 to resolve a speed difference when bridging a plurality of types of bus standards or a difference in processing speeds of connected components. Furthermore, computer programs or inter-process data is temporarily stored in the memory 7 when the CPU 6 controls the image-data processing system. Because the CPU 6 is required to perform high-speed processing, the CPU 6 starts a system by using a boot program stored in the ROM 14 at the time of a normal start-up process, and afterward, the CPU 6 performs processing by using computer programs loaded into the memory 7 that can be accessed at high speed. The memory 7 is a standardized Dual Inline Memory Module (DIMM) used in PCs.

The plotter I/F unit 8 performs bus bridge processing such that the plotter I/F unit 8 receives CMYK digital image data via the universal standard I/F integrated with the CPU 6 and then outputs the received CMYK digital image data to a dedicated I/F of the plotter unit 9. The universal standard I/F is a PCI-Express bus.

Upon receiving the CMYK digital image data, the plotter unit 9 performs a print operation on a recording medium such as a transfer sheet through an electrophotographic process using laser beams based on the received CMYK digital image data. Although it is possible to perform an output process by receiving image data corresponding to only black in the case of monochrome image output, image data corresponding to four channels of CMYK is always received for an output process in the embodiment for convenience of explanation.

A process to be used for output can be arbitrarily selected and can be performed by using an ink-jet engine that has been often used for personal use in recent years. In such a case, it is possible to have a configuration to deal with inks in multiple colors, for example, six or seven colors.

The SB 13 is a chipset used in a PC and is a universal electronic device. The SB 13 is implemented as a universal circuit with a bus bridge function often used for configuring a CPU system that includes a PCI-Express and an Industrial Standard Architecture (ISA) bridge. The SB 13 functions as a bridge to the ROM 14.

The ROM 14 is a memory in which computer programs used when the CPU 6 controls the image-data processing system are stored. It is a nonvolatile memory so that memory contents are not erased even if the power of the MFP is turned off. Computer programs for executing an operation (operation shown in FIG. 7) to perform a setting process for document editing described later and an output operation (operation shown in FIG. 13) are stored in the ROM 14 or other nonvolatile recording (storage) medium, such as an HDD, so that the CPU 6 loads control/processing programs, control data, or the like, stored in the recording medium in the memory 7 and drives the program upon executing a process, whereby the CPU 6 (computer) can function as an executing unit of the process.

The operation display unit 10 functions as an I/F between the image-data processing system and a user. The operation display unit 10 includes a liquid crystal display (LCD) that includes a touch panel and key switches. The operation display unit 10 displays various states of the MFP and operation methods on the LCD and detects an input from the user via the key switches. Alternatively, it is possible that the key switches are removed and all input operations are performed via the touch panel. The operation display unit 10 is connected to the CPU 6 via a PCI-Express bus.

The line I/F unit 11 connects the PCI-Express bus to a phone line. Thus, the image-data processing system can transfer various types of data via the telephone line. The line I/F unit 11 transmits and receives faxes to and from an external fax machine 15 or an apparatus having a fax function via a phone line.

The external I/F unit 12 connects the PCI-Express bus to an external device. Thus, the image-data processing system transmits and receives various types of control data or image data to and from an external device such as a PC 16. The Ethernet (registered mark) and a Universal Serial Bus (USB) are used as a connection I/F. The image-data processing system is connected to a network or an external medium 17 as an external device via the external I/F unit 12. Either a wired local area network (LAN) or a wireless LAN can be used as the network. The PC 16 performs various control operations or input and output operations of image data to the image-data processing system via application software or drivers installed in the PC 16. Furthermore, the external medium 17 is a memory device such as a Compact Flash (registered mark) Card or a Secure Digital (registered mark) Card. Various types of electronic data including image data are stored in the external medium 17, and the user performs input and output operations of image data to the image-data processing system via the external medium 17.

As described above, the MFP receives data (hereinafter, "external I/F input data") received from an external device such as the PC 16 or the external medium 17 via the external I/F unit 12 in addition to data ("hereinafter, "scanner input data") received from the reading unit 1, and performs a printing process using various types of received data within the MFP or performs a data output process via the external I/F unit 12. Input and output processes of the image data are different depending on the function to be used among the copy, fax, scanner, printer, and document box functions, and in some functions, the input and output processes are different depending on data to be used or an output destination.

Operations performed by the image-data processing system are divided into six operations 1 to 6 as main use cases in the input and output processes, i.e., operation 1 (from scanner input to plotter output), operation 2 (from scanner input to fax transmission), operation 3 (from scanner input to scanner distribution), operation 4 (from external I/F input to plotter output), operation 5 (from external I/F input to fax transmission), and operation 6 (from external I/F input to scanner distribution). The operations 1 to 3 are performed on scanner input image data, and the operations 4 to 6 are performed on external I/F image data. Although different input processes are performed in the operations 1 to 3 and the operations 4 to 6, a combination of three output processes, i.e., the plotter output, the fax transmission, and the scanner distribution, are the same.

Although each of the operations 1 to 6 starts with a process performed by a receiving device that receives image data such as the scanner input data or the external I/F input data, the received image data is used for an output process via the HDD 5 or the memory 7 as described below. Because an output operation that starts with a process performed using the image data stored in the HDD 5 or the memory 7 is the same as a re-output operation performed by using the document box function, the following descriptions also cover the explanation about the re-output operation of stored images.

With regard to the operation 1, after the user sets an original in the reading unit 1, the user specifies settings, such as an image processing mode, and gives an instruction for a copy start using the operation display unit 10. The operation display unit 10 converts information input by the user into control command data indicating a copy start in the MFP and issues the control command data. The issued control command data is sent to the CPU 6.

The CPU 6 executes a computer program for a copy process based on the control command data indicating the copy start and performs settings and operations necessary for the copy process in accordance with a process described below.

The first image-data processing unit 2 standardizes characteristics of the 8-bit-based RGB image data obtained by the reading unit 1 to predetermined characteristics and then sends the standardized RGB image data to the bus control unit 3. Moreover, information to be used for a subsequent control operation, or the like, is extracted from the image data as required.

Figure 2:
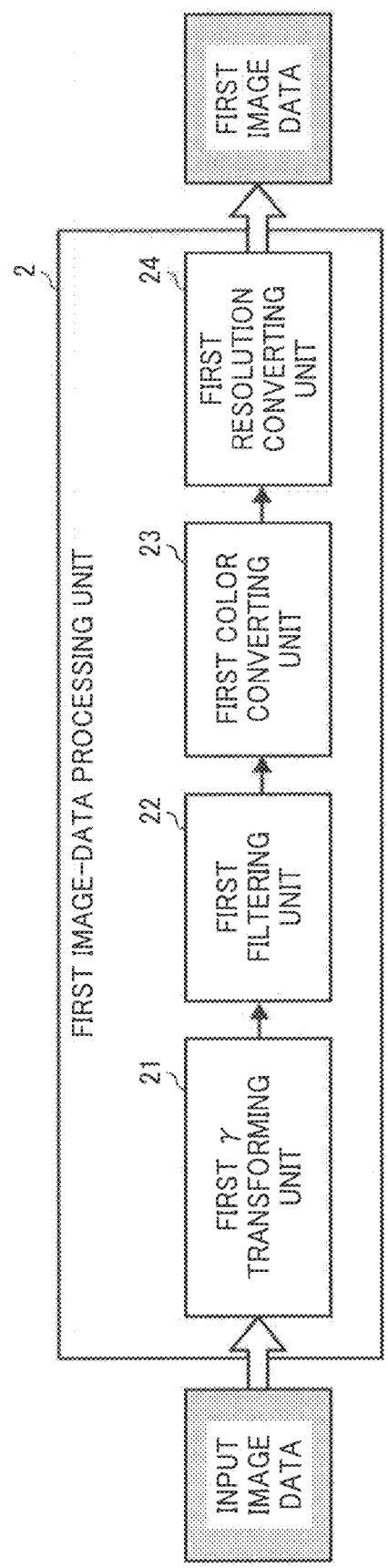
FIG. 2 is a block diagram that illustrates a detailed internal configuration of a first image-data processing unit shown in FIG. 1.

FIG. 2 is a block diagram that illustrates the detailed internal configuration of the first image-data processing unit 2.

Figure 4:
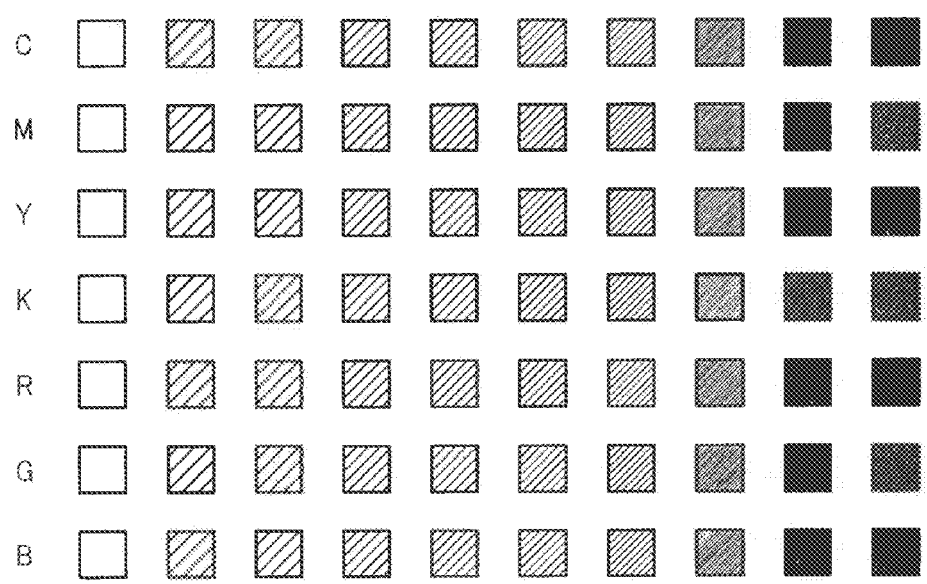
FIG. 4 is a reference chart of density patterns for transforming a γ characteristic according to the embodiment.

The first image-data processing unit 2 includes a first $\gamma$ transforming unit 21, a first filtering unit 22, a first color converting unit 23, and a first resolution converting unit 24. The first $\gamma$ transforming unit 21 converts, through $\gamma$ transformation, a $\gamma$ characteristic of the received 8-bit-based RGB image data into a predetermined characteristic, for example, $\gamma=2.2$, that is determined from a characteristic based on reflectance. FIG. 4 is a reference chart of density patterns corresponding to the color components CMYK and RGB for transforming the $\gamma$ characteristic. Image signals are converted so that a predetermined $\gamma$ characteristic is obtained when the reference chart is scanned.

Figure 3:
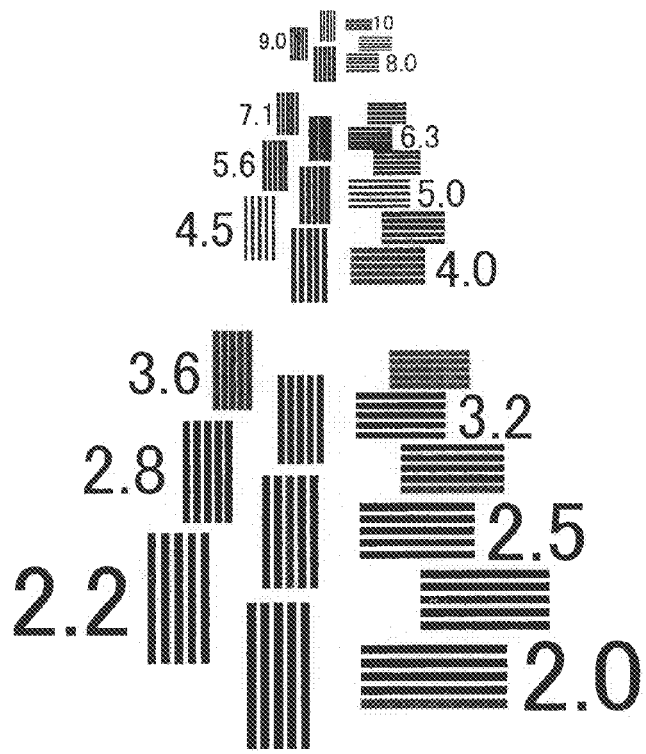
FIG. 3 is a reference chart of rectangular patterns for converting an MTF characteristic according to the embodiment.

The first filtering unit 22 converts a characteristic such as a Modulation Transfer Function (MTF) characteristic of the reading unit 1 into a predetermined characteristic. FIG. 3 is a reference chart of rectangular patterns with the number of lines sequentially changed for converting the MTF characteristic. The MTF characteristic is converted so that a predetermined MTF characteristic value is obtained with respect to the number of lines when the reference chart is scanned.

The first color converting unit 23 converts a color space of the RGB image data corresponding to the reading unit 1 into a predetermined color space and then outputs the converted image data. Although it is preferable that the color space after the conversion has a large size so as not to clip or compress the input RGB image data, if it is too large, it is difficult to obtain smooth gradation. The color space is converted so that an Adobe RGB color space that is one of standardized color spaces is obtained when the reference chart shown in FIG. 4 is scanned.

When the image data received from the reading unit 1 is output as first image data after processing performed by the first image-data processing unit 2, it is determined in advance that the first image data is always output with a resolution of 600 dots per inch (dpi). Therefore, the first resolution converting unit 24 converts the resolution of the first image data to 600 dpi. It can be a different resolution other than 600 dpi.

The characteristics of the image data are standardized by the first image-data processing unit 2, i.e., the image data that depends on the characteristics of the reading unit 1 is normalized and converted into universal data, and then the universal data is sent to the bus control unit 3.

Upon receiving the RGB image data from the first image-data processing unit 2, the bus control unit 3 loads and stores the received RGB image data in the memory 7 via the CPU 6. Furthermore, the RGB image data loaded in the memory 7 is not only used for a current operation but also stored in the HDD 5 as required in response to a storage instruction received from a user so as to be reused for a subsequent operation or to be used as unprocessed image data for multi-address transmission to a plurality of output destinations by fax, editing, or the like.

Not only the RGB image data is stored in the HDD 5 but also thumbnail image data with a lower resolution to be used for image search performed when the RGB image data is used is stored in the HDD 5 in association with the unprocessed universal RGB image data. Because the file size of the thumbnail image data is small, it is possible to always store the thumbnail image data regardless of whether the image data needs to be stored in the HDD 5. Although the CPU 6 performs resolution conversion and standard RGB (sRGB) color space conversion on the stored image data thereby generating the thumbnail image data, it is possible that the second image-data processing unit 4 performs a color conversion process and a resolution conversion process as described later. The thumbnail image data is generated with two resolutions, i.e., 72 dpi and 144 dpi.

The RGB image data stored in the memory 7 (the first universal image data processed by the first image-data processing unit 2) is sent to the second image-data processing unit 4 via the CPU 6 and the bus control unit 3.

When the RGB image data processed by the first image-data processing unit 2 is sent via the bus control unit 3 or stored in the HDD 5, a data compression/expansion process is performed on the RGB image data as required so that the RGB image data can be processed in an efficient manner. The data compression/expansion process can be performed by operating a computer program in the CPU 6.

Because the plotter output is to be performed in this use case, the second image-data processing unit 4 converts the received RGB image data into CMYK image data to be used for an output process performed by the plotter unit 9 and outputs the CMYK image data.

Figure 5:
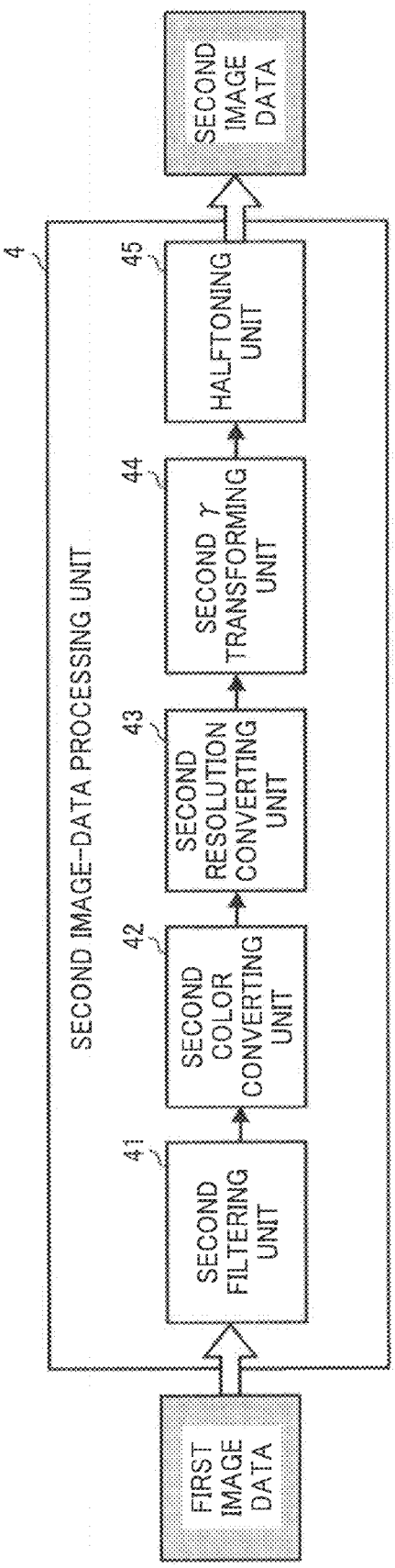
FIG. 5 is a block diagram that illustrates a detailed internal configuration of a second image-data processing unit shown in FIG. 1.

FIG. 5 is a block diagram that illustrates the detailed internal configuration of the second image-data processing unit 4.

The second image-data processing unit 4 includes a second filtering unit 41, a second color converting unit 42, a second resolution converting unit 43, a second γ transforming unit 44, and a halftoning unit 45.

The second filtering unit 41 corrects sharpness and the signal-to-noise (S/N) ratio of the RGB image data so that reproducibility of the RGB image data to be output to the plotter unit 9 is improved. The second filtering unit 41 performs sharpening and smoothing processes on the RGB image data based on image processing mode information specified by the user. For example, in the case of a character mode, the second filtering unit 41 performs the sharpening process in order to output characters sharply and clearly. In the case of a photograph mode, the second filtering unit 41 performs the smoothing process in order to represent smooth gradation.

Upon receiving the 8-bit-based RGB image data, the second color converting unit 42 converts the received 8-bit-based RGB image data into 8-bit-based CMYK image data corresponding to the color space to be used by the plotter unit 9. If a color mode is a full-color output mode, the second color converting unit 42 performs the color conversion process to represent CMYK images, and if the color mode is a monochrome output mode, the second color converting unit 42 performs the color conversion process to represent only K images.

The second resolution converting unit 43 converts the resolution of the CMYK image data in accordance with the capability of the plotter unit 9. Because the plotter unit 9 is capable of 600 dpi output, the second resolution converting unit 43 does not perform the resolution conversion process for the plotter output.

To standardize the plotter output, the second γ transforming unit 44 performs γ transformation on the CMYK image data based on a γ characteristic set in accordance with specific process characteristics of the plotter unit 9.

Upon receiving the 8-bit-based CMYK image data, the halftoning unit 45 performs a halftone process corresponding to the gradation process capability of the plotter unit 9. The halftone process is performed by using an error diffusion method that is one of digital halftone processes to obtain 2-bit-based CMYK image data.

After processing by the second image-data processing unit 4, the 2-bit-based CMYK image data output as second image data is sent to the bus control unit 3.

Upon receiving the CMYK image data from the second image-data processing unit 4, the bus control unit 3 loads the received CMYK image data into the memory 7 via the CPU 6. The CMYK image data loaded into the memory 7 is sent to the plotter unit 9 via the CPU 6 and the plotter I/F unit 8.

Moreover, the CMYK image data used for the plotter output is stored in the HDD 5 as required in accordance with a storage instruction received from the user so as to be used for a re-output operation. If an editing process has been performed on the image data used for the plotter output, the image data is stored in the HDD 5 as edited image data used for re-output. Information indicating a processing condition (processing content) set for a process for generating output image data, such as an editing process, is managed as usage log information in association with stored image data to be output.

Thumbnail image data is generated for the edited image data in the same manner as the unedited RGB image data. The CPU 6 performs color conversion from CMYK to sRGB to generate thumbnail image data with two resolutions, i.e., 72 dpi and 144 dpi. If the thumbnail image data is generated in the above manner, when the CMYK image data that depends on the plotter unit 9 is converted into sRGB image data, image quality deteriorates. Therefore, in order to obtain high image quality, it is possible to generate thumbnail image data directly from unedited RGB image data by processing performed by the second image-data processing unit 4 as described above.

Upon receiving the CMYK image data from the second image-data processing unit 4, the plotter unit 9 outputs images to a recording medium by printing based on the CMYK image data, thereby generating a copy of the original.

In the operation 2, the scanner input is performed in the same manner as the operation 1. However, although the plotter output is performed in the operation 1, the fax transmission is performed in the operation 2. Thus, different output processes are performed in the operations 1 and 2. The input process performed on the scanner input image data, i.e., the process performed by the first image-data processing unit 2 to obtain image data and the process for storing the image data in the HDD 5, correspond to a process for generating universal RGB image data that can be commonly used for any output process. Thus, the scanner input image data is converted into universal image data and the universal image data is stored in the HDD 5 so that the universal image data can be commonly used for the copy, the fax, and the scanner functions, whereby high applicability can be achieved.

The explanation about the operation 1 will be referred to for the input process performed on the scanner input image data. When the scanner input image data is stored in the HDD 5, thumbnail image data used for image search is generated and the generated thumbnail image data is stored in the HDD 5 in the same manner as described above.

As shown in FIG. 5, the second filtering unit 41 corrects sharpness of the RGB image data so that reproducibility of the RGB image data upon fax transmission is improved. The second filtering unit 41 performs the sharpening and the smoothing processes on the RGB image data based on image processing mode information specified by the user (the processing method is the same as that in the operation 1).

Upon receiving the 8-bit-based RGB image data, the second color converting unit 42 converts the RGB image data into 8-bit-based single-color (monochrome) image data that is generally used in fax machines. If a transmission destination is a color fax machine, the conversion process can be performed in the same manner as that performed for the plotter unit 9. If a color mode is a full-color output mode, the second color converting unit 42 performs the color conversion process to represent RGB images, and if the color mode is a monochrome output mode, the second color converting unit 42 performs the color conversion process to represent grayscale images.

The second resolution converting unit 43 converts the resolution of monochrome image data into the resolution to be transmitted and received by a fax machine. For example, the second resolution converting unit 43 converts the resolution into 200 dpi in the main-scanning direction×100 dpi in the sub-scanning direction.

The second γ transforming unit 44 corrects a γ characteristic of the monochrome image data so that the reproducibility upon the fax transmission is improved. The γ transformation is performed with high contrast in order to output characters sharply and clearly in the character mode, and the γ conversion is performed with a moderate tone curve in order to represent smooth gradation in the photograph mode.

The halftoning unit 45 receives the 8-bit-based monochrome image data and performs the halftone process corresponding to a halftone process capability for transmission and reception by the fax machine. An error diffusion method that is one of digital halftone processes is used to obtain binary data. The 8-bit-based monochrome image data is output without the halftone process in the case of an output process for a color fax machine.

Upon receiving the monochrome binary image data from the second image-data processing unit 4 via the CPU 6, the bus control unit 3 loads the received monochrome binary image data into the memory 7. The monochrome binary image data loaded into the memory 7 is sent to the line I/F unit 11 via the CPU 6.

In addition to the above output process, image data to be output and its thumbnail image data are stored in the HDD 5 as required in response to a storage instruction received from the user so that the image data and the thumbnail image data can be used for a re-output operation (the processing method is the same as that performed on the output image in the operation 1).

Upon receiving the monochrome binary image data from the second image-data processing unit 4, the line I/F unit 11 transmits the received monochrome binary image data to the fax machine 15 connected via a line in accordance with a transmission protocol.

In the operation 3, the scanner input is performed in the same manner as the operation 1. However, although the plotter output is performed in the operation 1, scanner distribution (the scanner input image data is transmitted via a network) is performed in the operation 3. Thus, different output processes are performed in the operations 1 and 3. In the same manner as in the operations 1 and 2, the input process is performed such that the scanner input image data is converted into universal image data and the universal image data is stored in the HDD 5.

The explanation about the operation 1 will be referred to for the input process performed on the scanner input image data. When the scanner input image data is stored in the HDD 5, thumbnail image data used for image search is generated and the generated thumbnail image data is stored in the HDD 5 in the same manner as described above.

As shown in FIG. 5, the second filtering unit 41 corrects the sharpness of the RGB image data so that the reproducibility of the RGB image data upon the scanner distribution is improved. The second filtering unit 41 performs sharpening and smoothing processes on the RGB image data based on image processing mode information specified by the user (the processing method is the same as that used in the operation 1).

Upon receiving the 8-bit-based RGB image data, the second color converting unit 42 converts the color space of the RGB image data into a specified color space. For example, the color space is converted into an 8-bit-based color space corresponding to sRGB standard that is generally used for the scanner distribution. Because it is possible to perform the scanner distribution based on grayscale image data or monochrome binary image data instead of the sRGB image data in the same manner as the fax transmission performed in the operation 2, the image data can be converted into data in various colors. If a color mode is a full-color output mode, the second color converting unit 42 performs the color conversion process to represent sRGB image data, and if the color mode is a monochrome output mode, the second color converting unit 42 performs the color conversion process to represent grayscale images.

The second resolution converting unit 43 converts the resolution of the sRGB image data into the resolution to be transmitted and received through the specified scanner distribution. For example, the second resolution converting unit 43 converts the resolution into 200 dpi in the main-scanning direction×200 dpi in the sub-scanning direction.

The second γ transforming unit 44 corrects a γ characteristic of the sRGB image data so that the reproducibility upon the scanner distribution is improved. Because color matching has already been performed by converting the color space into a color space corresponding to the sRGB standard, the γ transformation is not performed.

The halftoning unit 45 performs the halftone process based on a halftone process capability for transmission and reception through the specified scanner distribution. The gradation process is not performed based on the assumption that the 16 million colors of 8-bit-based RGB image data are specified.

Upon receiving the image data from the second image-data processing unit 4 via the CPU 6, the bus control unit 3 loads the received image data into the memory 7. After the image data is loaded and stored in the memory 7, the image data is sent to the external I/F unit 12 via the CPU 6.

In addition to the above output process, image data to be output and its thumbnail image data are stored in the HDD 5 as required in response to a storage instruction received from the user whereby the image data and the thumbnail image data can be used for a re-output operation (the processing method is the same as that performed on the output image in the operation 1).

Upon receiving the image data from the second image-data processing unit 4, the external I/F unit 12 transmits the image data to the external device such as the PC 16 via the network or the external medium 17 via a USB connector (not shown), or the like.

The operation 4 will be explained below. The external I/F input data is data input from an external device via the external I/F unit 12. The external device is, for example, the external medium 17 such as a memory card. After a user connects the external medium 17 in which image data is stored to the external I/F unit 12, the user specifies settings such as an image processing mode and gives an instruction for a print start using the operation display unit 10. The operation display unit 10 converts information and data input by the user into control command data and issues the control command data.

Other external devices are, for example, the PC 16 connected to the MFP via the network. The PC 16 inputs a print request command (image data to be output and setting data such as an image processing mode) and data for instructing a print start via the external I/F unit 12, thereby making a print output request. The CPU 6 receives the command and the data from the PC 16 and recognizes a control command for the print output request.

The CPU 6 executes a computer program for a printing process in response to the control command indicating the print start and performs settings and operations necessary for the plotter output in accordance with a process described below.

Because image data received from the external medium 17 or the PC 16 is to be used by the same output device (the plotter unit 9) as that used in the operation 1 (the plotter output), characteristics of the internal I/F input image data are standardized to predetermined characteristics to be generated as universal data, and the universal data is stored in the HDD 5 so that the universal data can be used for an output process performed by the plotter unit 9.

The 8-bit-based RGB digital image data based on the standardized color space received from the external medium 17 via the external I/F unit 12 or the 8-bit-based RGB digital image data based on the standardized color space received from the PC 16 as the print request command after a rendering process is stored in the memory 7 via the CPU 6 without converting the standardized color space. Although various definitions can be applied to the standardized color space, sRGB and AdobeRGB are often used.

If a color space of the RGB image data received with the print output request is not a standardized color space, the RGB image data stored in the memory 7 is sent to the second image-data processing unit 4 via the CPU 6 and the bus control unit 3, whereby the color space of the RGB image data is converted into a standardized color space in accordance with user settings and the image data is stored in the memory 7 again.

When the external I/F input image data is stored in the HDD 5, thumbnail image data used for image search is generated and the generated thumbnail image data is stored in the HDD 5. These processes can be performed in the same manner as the processes performed in the operations 1 to 3 for storing input images.

The RGB image data corresponding to the standardized color space stored in the memory 7 is sent to the second image-data processing unit 4 via the CPU 6 and the bus control unit 3.

Upon receiving the RGB image data corresponding to the standardized color space, the second image-data processing unit 4 converts the received RGB image data into CMYK image data used for the plotter output and then outputs the CMYK image data to the plotter unit 9. Because the process performed by the second image-data processing unit 4 is the same as that performed on output image data in the operation 1, detailed explanation is omitted.

Upon receiving the CMYK image data from the second image-data processing unit 4, the plotter unit 9 outputs images to a transfer sheet as a recording medium based on the CMYK image data. In addition to this output process, image data to be output and its thumbnail image data are stored in the HDD 5 as required in response to a storage instruction received from the user, so that the image data and the thumbnail image data can be used for the re-output operation. Because the print output operation by using the CMYK image data received from the second image-data processing unit 4 and the operation of storing the output image data are the same as the output operation performed in the operation 1, detailed explanation is omitted.

In the operation 5, the external I/F input is performed in the same manner as the operation 4. However, although the plotter output is performed in the operation 4, the fax transmission is performed in the operation 5. Thus, different output processes are performed in the operations 4 and 5. The input process performed on external I/F input image data, i.e., the process performed by the first image-data processing unit 2 to obtain image data and the process for storing the image data in the HDD 5, corresponds to a process for generating standardized universal RGB image data that can be commonly used for any output process. Because the external I/F input image data is converted into universal image data and the universal image data is stored in the HDD 5, the universal image data can be commonly used for the copy, the fax, and the scanner functions, whereby high applicability can be achieved.

Because the input process performed on external I/F input image data is the same as the input process performed in the operation 4, detailed explanation is omitted. When the external I/F input image data is stored in the HDD 5, thumbnail image data used for image search is generated and the generated thumbnail image data is stored in the HDD 5 in the same manner as described above.

Because the external I/F input image data is converted into the universal RGB image data during the input process, the fax transmission is performed based on the universal RGB image data. Because the output process and the transmission operation of the fax transmission based on the universal RGB image data is the same as those described in the operation 2, detailed explanation is omitted.

In addition to the output process of the fax transmission, image data to be output and its thumbnail image data are stored in the HDD 5 as required in response to a storage instruction received from a user, whereby the image data and the thumbnail image data can be used for a re-output operation (the processing method is the same as that performed on the output image in the operation 1).

In the operation 6, the external I/F input is performed in the same manner as the operation 4. However, although the plotter output is performed in the operation 4, the scanner distribution is performed in the operation 5. Thus, different output processes are performed in the operations 4 and 5. The input process performed on the external I/F input image data, i.e., the process performed by the first image-data processing unit 2 to obtain image data and the process for storing the image data in the HDD 5, corresponds to a process for generating standardized universal RGB image data that can be commonly used for any output process. Because the external I/F input image data is converted into universal image data and the universal image data is stored in the HDD 5, the universal image data can be commonly used for the copy, the fax, and the scanner functions, whereby high applicability can be achieved.

Thus, because the input process performed on external I/F input image data is the same as the input process performed in the operation 4, detailed explanation is omitted. When the external I/F input image data is stored in the HDD 5, thumbnail image data used for image search is generated and the generated thumbnail image data is stored in the HDD 5 in the same manner as described above.

Because the external I/F input image data is converted into the universal RGB image data during the input process, the scanner distribution is performed based on the universal RGB image data. Because the output process and the transmission operation of the scanner distribution based on the universal RGB image data is the same as those described in the operation 3, detailed explanation is omitted.

In addition to the output process of the scanner distribution, image data to be output and its thumbnail image data are stored in the HDD 5 as required in response to a storage instruction received from a user, so that the image data and the thumbnail image data can be used for a re-output operation (the processing method is the same as that performed on the output image in the operation 1).

In the above use cases, it is explained that the input and output processes starts using an input device (the scanner, the external medium, or the like) from which image data such as the scanner input image data or the external I/F input image data is input. However, the output process can start using image data stored in the HDD 5 or the memory 7 for the re-output operation.

Sometimes image data stored during a previous output process is output with new processing contents performed thereon. For example, such an output process includes a combining process. When a plurality of originals is to be output in a combined manner, there are various combinations for the combining process, for example, images of two originals are to be output to one recording medium, or images of eight originals are to be output to one recording medium. In the following description, it is explained that images of two A4-sized originals are to be output to an A4-sized recording medium, i.e., 2-in-1 output.

Image data about the two A4-sized originals are read from the HDD 5 and output image data is generated from the image data by the second image-data processing unit 4. Because the images of the two A4-sized originals are to be output to an A4-sized recording medium, the second resolution converting unit 43 converts the resolution of 600 dpi to 300 dpi, i.e., 50% reduction.

Upon receiving the image data whose resolution has been converted for the combining process from the second image-data processing unit 4, the bus control unit 3 stores the image data in the memory 7 via the CPU 6.

The image data corresponding to the two originals stored in the memory 7 are output side-by-side as images of one recording medium, whereby 2-in-1 output can be achieved. The operation of outputting the images side-by-side can be achieved by loading the image data corresponding to the two originals with addresses of the image data located at storage areas of the memory 7 corresponding to one A4-sized recording medium or continuously reading the image data from the memory 7 based on the A4-sized recording medium upon the output process of the image data from the memory 7.

As another example of the combining process, images of the two A4-sized originals are to be output to an A3-sized recording medium, i.e., 2-in-1 output. In such a case, because the images of the two A4-sized originals can be output to the A3-sized recording medium only by arranging the images of the two A4-sized originals side-by-side, it is not necessary to convert the resolutions of the images of the two A4-sized originals; therefore, the images of the two A4-sized originals are output with a resolution of 600 dpi without conversion (at the same magnification).

If the resolution conversion is performed during the combining process, image quality can deteriorate due to the resolution conversion. The deterioration of the image quality can be reduced by adjusting the parameter to be used for image processing, such as filtering or color conversion, performed by the second image-data processing unit 4 depending on the resolution conversion of the combining process. If the deterioration of the image quality is not considered, it is not necessary to change a process other than the resolution conversion depending on different combining conditions.

In the above use cases, the explanation has been given for the process for outputting the input image data or the stored image data depending on an output destination for each of the three types of applications, i.e., the plotter output, the fax transmission, and the scanner distribution. However, in some cases, an application for the input image data has not been determined.

In such a case, it is possible to only store image data. Such an operation is supported by the document box function of the MFP. If only the operation of storing the image data is performed, a user specifies an application, such as the plotter output, the fax transmission, or the scanner distribution, at an appropriate timing and instructs the stored image data to be output, whereby the image data can be reused as required.

As described above, the scanner input image data or the external I/F input image data can be stored in the HDD 5 or the memory 7, and the stored scanner input image data or the stored external I/F input image data can be used to be output at a timing specified by a user. Upon the output process being performed based on the stored image data, the user selects one of the applications, i.e., the plotter output, the fax transmission, and the scanner distribution, and instructs the stored image data to be output.

Upon instructing the stored image data to be output, the user can reset the contents of the output process. A function of resetting processing contents upon the re-output operation of the stored image data is conventionally known. However, the conventional function makes it possible only to perform operations to display information about processing contents used for the stored image data, modify contents of an editing process, change the parameter to be used for a predetermined target to be adjusted, or change an output destination. Therefore, it is not easy for a user who is not used to performing an editing process to set an appropriate operation to meet the user's intention.

Therefore, in the embodiment, when the user resets the contents of the output process to be performed on the stored image data specified by the user, not only the processing contents set for the image data during a previous output process are displayed to the user, but also an extended range of the processing contents is displayed. The extended range of the processing contents includes processing contents related to target image data (processing contents used for the target image during different output processes), processing contents related to a process instructed by an output request (processing contents used for different output processes in which part of the processing contents are common), and processing contents frequently used for all image data. Information about these processing contents is obtained from usage log management information in which the processing contents used for the output process are managed in association with output image data. Because a processing log of all processes that have been performed is recorded in the usage log management information, it is possible to extract processing contents that meet the above condition.

Target image data that has been processed based on the extracted processing contents can be previewed in association with the processing contents.

Thus, even if the user is not used to setting the processing contents, the user can find an appropriate processing method from a wide range of variations of processing contents available to the user.

When the user sets the output process to be performed on the stored image data, the user performs the above setting process via the operation display unit 10 that functions as an I/F for a user. The process for setting processing contents is explained below by taking an editing process that is one of the output processes as an example.

Figure 6:
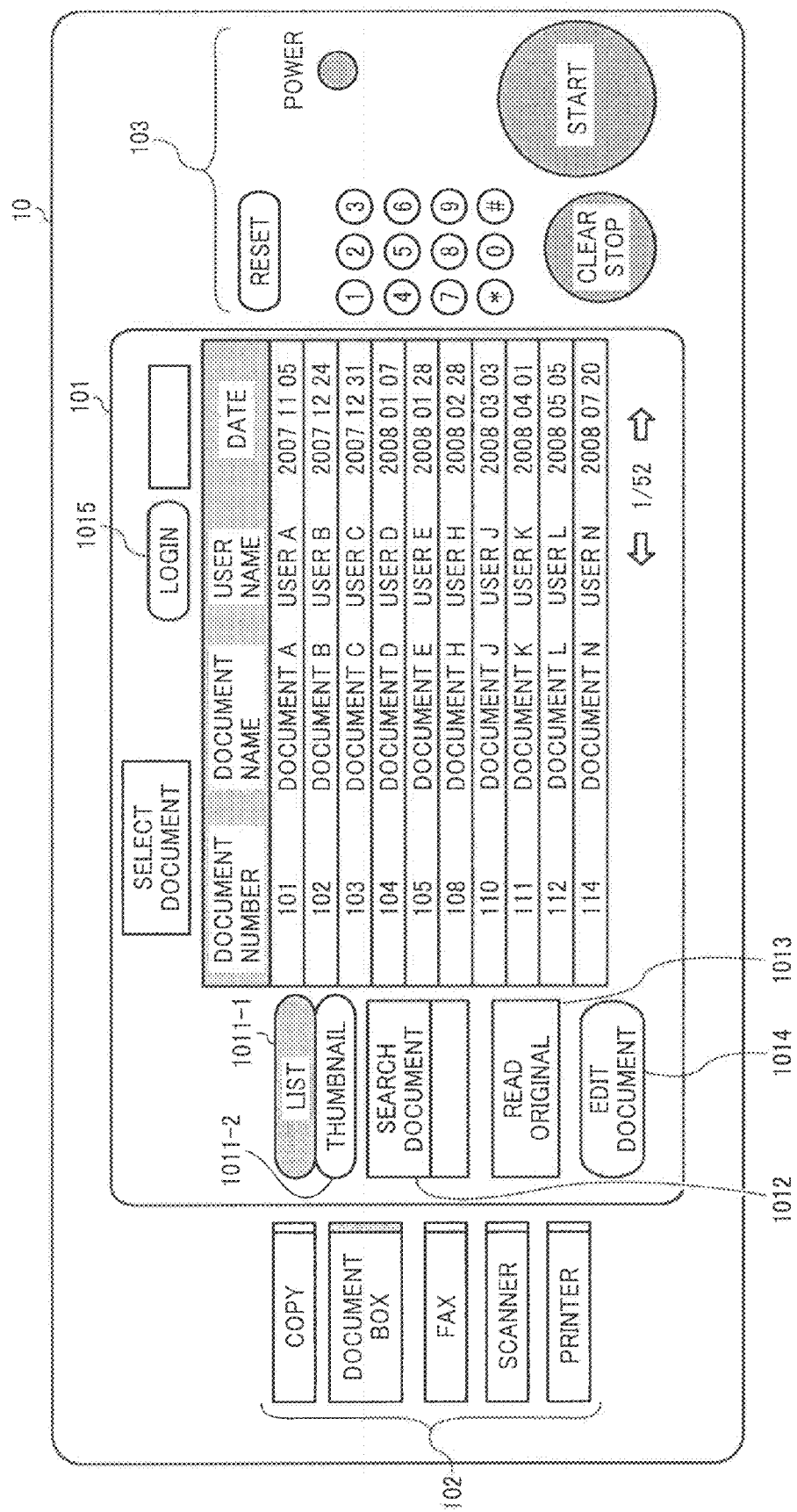
FIG. 6 is a schematic diagram of a screen of an operation display unit shown in FIG. 1 when a user operates "select document" provided by the document box function.

FIG. 6 is a schematic diagram of a screen of the operation display unit (operation panel) 10 when a user operates "select document" provided by the document box function.

The operation display unit 10 includes a touch panel (LCD) 101 and key switches including a group of keys 103 and a group of application keys 102 in a combined manner.

The application keys 102 include keys for copy, document box, scanner, fax, and printer functions. Each of the keys has a built-in light-emitting diode (LED), whereby a selected key is indicated with lightning of the LED. In an example shown in FIG. 6, because the stored document data (image data) is selected and the selected document data is to be output, the LED arranged on the right side of a button for the document box function is turned on. An application corresponding to an unused function can be removed from applications included in the MFP and if a function is removed, a cover is placed as a blinder over the corresponding application key instead of removing the application key.

A list of document data stored in the above various processes is displayed in a middle area of the touch panel 101. In the list, "document number", "document name", "user name", and "date" are displayed side-by-side. Contents displayed in the list are selected from bibliographic information managed in association with document data as required, and the displayed contents can be changed so that the selected contents are displayed within the screen.

If it is difficult for the user to find target document data from the list displayed on the screen, the user can switch to thumbnail view by selecting a "thumbnail" button 1011-2 located on the left of the screen. As described above, thumbnail image data that is generated during the output process and stored in association with original image data is used for the thumbnail view.

The user can switch the thumbnail view to the list view by selecting a "list" button 1011-1 located on the left of the screen.

When the list of stored document data, and the like, is displayed on the touch panel 101, the amount of document data that can be displayed at one time is limited. Therefore, target document data can be extracted by using a search function. If the user selects an input window located under a "search document" button 1012 located on the left of the screen, inputs a document name in the input window, and selects the "search document" button 1012, only document data relating to the document name input by the user are displayed on the screen. Document search can be performed by using not only a perfect matching search but also a fuzzy search used for web searches.

The keys 103 located on the extreme right of the operation display unit 10 includes a numeric keypad for entering numbers, a clear/stop key for clearing a set value and stopping an operation, a start key for starting various operations, a reset key for clearing a set value and restoring default states. A key commonly used for various functions is implemented by using the key switches, so that the screen of the touch panel 101 can be efficiently used.

To meet a user's request that document data is first stored and then the stored document data is output if necessary, it is possible to read images of an original by operating the screen shown in FIG. 6. A "read original" button 1013 is located on the left of the screen. If the user selects the "read original" button 1013, the images of the original are read as stored document data, and the stored document data is selected. The user does not need to select the document data after the reading operation is performed on the original.

A "login" button 1015 for authenticating a user is located on the top of the screen and an input window for entering a user's name is located next to the "login" button 1015. When the input window is selected by the user, a software keyboard is displayed on the screen so that a user's name can be input by the user. If the "login" button 1015 is selected by the user after entry of the user's name, user authentication is performed. Because the user authentication is performed by a commonly known technique, detailed explanation is omitted. Alternatively, the user authentication can be performed by using an authentication card or a USB device. After the user is authenticated, the user is registered in a usage log of an output process, or the like, and when the list of stored document data, or the like, is displayed, the user's name is also displayed on the screen.

If the stored document data is to be selected on the "select document" screen shown in FIG. 6 and the selected document data is to be output without any modification, the start key is pressed while the document data is selected, whereby the document data is output to a set output destination without modification.

If the user desires to perform editing on the selected document data to be output, the user selects an "edit document" button 1014 located on the lower left of the screen. Thus, the "select document" screen is switched to an "edit document" screen (see FIG. 8). To perform the output process based on processing (editing) contents desired by the user during the document editing, the user performs an operation for setting the editing contents using the "edit document" screen of the touch panel 101. As described above, this setting process includes a process for displaying the processing (editing) contents to be selected based on the usage log management information.

Figure 7:
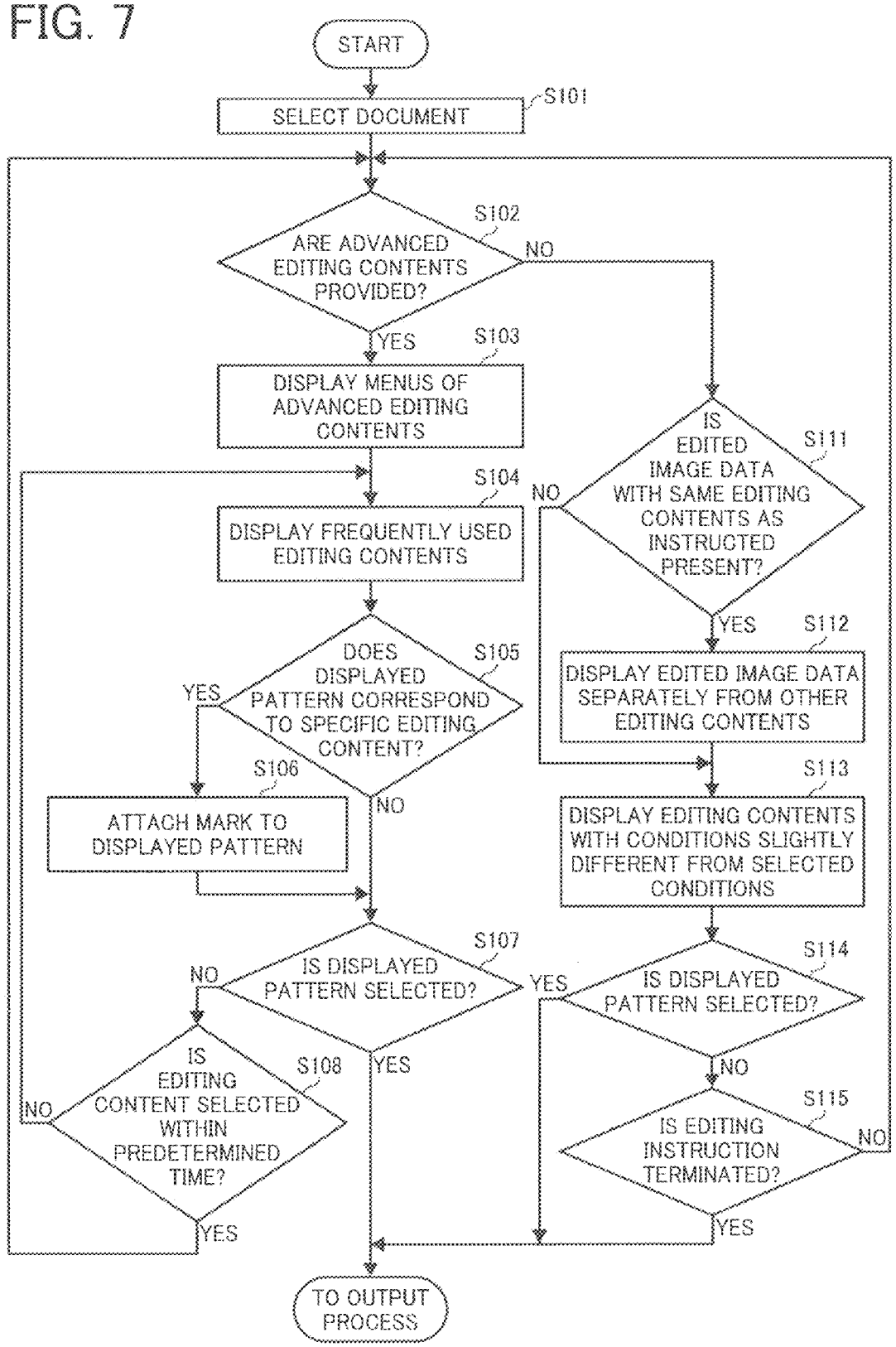
FIG. 7 is a flowchart of a setting process performed by the MFP.

FIG. 7 is a flowchart of the setting process performed by the MFP for the document editing.

If the user selects target document data from stored document data using the "select document" screen shown in FIG. 6 and then selects the "edit document" button 1014, the "select document" screen is switched to the "edit document" screen (Step S101).

Figure 8:
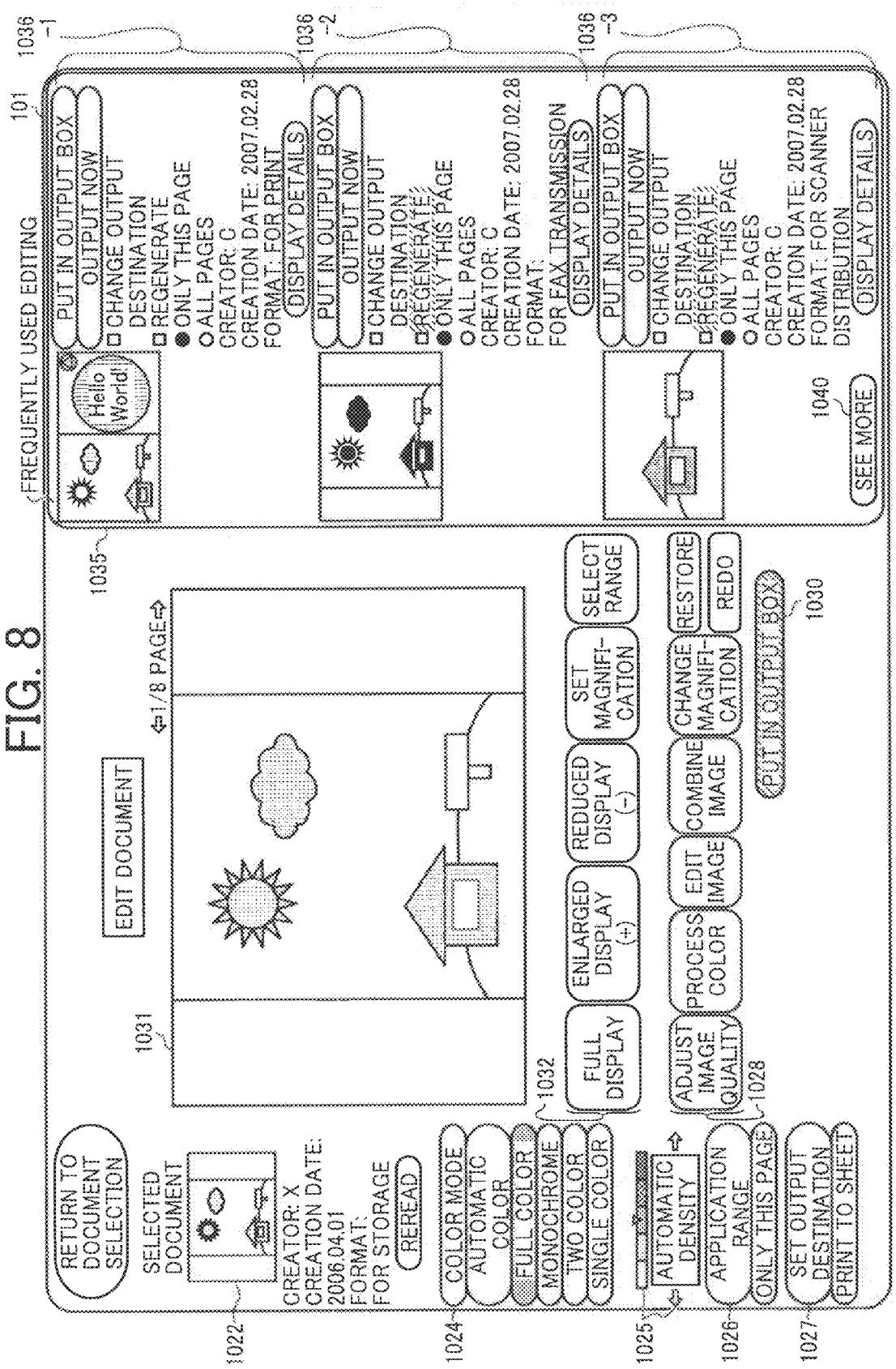
FIG. 8 is a schematic diagram of the screen when the user selects an "edit document" button displayed on the screen shown in FIG. 6.

FIG. 8 is a schematic diagram of the screen when the user selects the "edit document" button 1014. The selected document data and menus necessary for editing are displayed on the "edit document" screen.

In addition to the selected document data, document data for which different editing contents are set are displayed as candidates. The document data displayed as the candidates is referred to by the user when the user performs setting operations and is edited by setting frequently used editing contents for the selected document data. The frequently used editing contents are acquired from the usage log management information.

When the document data is displayed as candidates, frequently used editing contents are selected with high priority among editing contents that have been used for the selected document data.

If document editing is performed on the selected document data for the first time, or if usage frequency is lower than a predetermined value although there is the usage log, the usage frequency of editing contents used for a wider range of document data, i.e., for all document data, other than the selected document data is considered, and widely used editing contents are displayed depending on the usage frequency.

When the user has logged on after authentication, if there are editing contents that have been used by the user even for document data different from target document data, the editing contents are displayed with high priority.

When document data is to be displayed as a candidate, if the output process has been previously performed and therefore edited image data is stored, thumbnail image data of the output image data generated and stored during the output process is displayed on the screen.

Conversely, if the edited image data is not stored and only setting information about the editing process is stored, a display operation is performed using the two methods described below. In a first method, a message indicating that the editing image data is not stored is displayed on the screen. In a second method, image processing is performed on the selected image data by using the second image-data processing unit 4 in accordance with settings of the editing process to generate an output image and the output image is displayed on the screen.

The display operation to be performed when the edited image data is not stored can be selected by using settings for the MFP, and if the user does not desire to put a heavy load on the MFP or take a long time for generating output image data, it is preferable to perform the display operation using the first method. Furthermore, in the first method, it is preferable to not only display the message indicating that the editing image data is not stored but also display the settings for the editing process as text.

A thumbnail 1022 of the selected document data is displayed on the upper left of the screen of the touch panel 101 shown in FIG. 8, concise bibliographic information of the selected document data is displayed under the thumbnail 1022, and the selected document data is previewed in an image display area 1031 located in the middle area of the screen.

A group of buttons 1032 and a group of buttons 1028 including buttons to "adjust image quality", "process color", "edit image", "combine image", and "change magnification" are arranged under the selected document data previewed on the screen. The buttons 1032 are used to select a menu for enlarging or reducing the size of the previewed document data, and the like. The buttons 1028 are used to select a menu used for the editing process.

Because the menu used for the editing process is arranged in a hierarchical manner, only a top menu is displayed on the screen.

A "color mode" selection button 1024 is located on the left of the "edit document" screen. The "color mode" selection button 1024 is used to select a color. The "color mode" selection button 1024 is a frequently used menu for the output process. Color modes include an "automatic color" mode, a "full color" mode, a "monochrome" mode, a "two color" mode, and a "single color" mode. In the "automatic color" mode, it is automatically determined whether it is a color or a monochrome. Although a corresponding operation button is arranged for each of the modes, if an output destination is changed, only a color mode that can be output by the output destination is displayed on the screen. For example, in the case of a fax transmission (except for color fax transmission), the user can select only the monochrome mode. In the example shown in FIG. 8, the full color mode is selected.

A "density notch" button and an "automatic density" button indicated with the reference numeral 1025 are located under the "color mode" selection button 1024 so that a frequently used density adjustment function can be easily used by the user.

An "application range" button 1026 and a "set output destination" button 1027, both pull-down menu buttons, are located on the lower left of the "edit document" screen. The "application range" button 1026 is used to set a range to which the editing contents specified by the user are applied. The "set output destination" button 1027 is used to select an output destination. When the "application range" button 1026 is selected by the user, menus of "only this page", "specify page", and "all pages" are pulled down. The user can select any one of the menus. In the example shown in FIG. 8, only the page displayed on the screen is selected.

When the "set output destination" button 1027 is selected by the user, items that can be used for the output process are pulled down. The user can select one of the following menus: "print to sheet", "distribute to PC", "transmit to fax", and "store in document box". In the example shown in FIG. 8, the menu "print to sheet" is selected.

Three editing setting examples 1036-1, 1036-2, and 1036-3 are displayed on the right side of the "edit document" screen shown in FIG. 8. The editing setting examples 1036-1, 1036-2, and 1036-3 are generated by performing frequently used editing contents on the selected document data (the image data previewed at the image display area 1031) and displayed in descending order of usage frequency from the top of the screen.

The first editing setting example 1036-1 is generated by changing some of the colors of the document data, combining the document data for 2-in-1 output, and specifying settings for the plotter output. The second editing setting example 1036-2 is generated by binarizing the document data and specifying settings for the fax transmission. The third editing setting example 1036-3 is generated by extracting a lower portion of the document data and specifying settings for the scanner distribution.

Although the number of editing contents that can be displayed on the screen is limited, if the user desires to see editing contents other than the displayed editing contents, the user selects a "see more" button 1040 arranged on the lower right of the screen so that other frequently used editing contents are displayed on the screen.

If a specific editing content such as an environment-friendly editing process, for example, a process for combining image data or a process for saving toner, is included in the editing contents, specific marks are displayed with editing setting examples (the image data displayed on the right side of the screen) on the screen. It is preferable to, for example, increase the number of specific marks attached to image data depending on the degree of environmental friendliness so that the user can recognize the degree of environmental friendliness. Any method can be used instead of the specific marks as long as the user can recognize the environmental friendliness.

In the example shown in FIG. 8, a mark that represents a tree is attached to an upper right position of the first editing setting example 1036-1 on which the combining process has been performed, whereby it is indicated that the environment-friendly editing process has been performed on the image data.

Furthermore, if editing contents are performed by using combinations of colors in conformity with a color universal design, a specific mark that represents an image of the color universal design is attached to the image data. Thus, the user can recognize that the editing contents have specific effects. An administrator of the MFP can change or add conditions for attaching specific marks, whereby it is possible to make the user to recognize various effects of the editing process.

If the user is satisfied with the displayed editing contents and does not feel the need to perform any editing operation, the user selects an "output now" button attached to the corresponding editing setting example (i.e., 1036-1 to 1036-3) and presses the start key for the output process.

If the user does not desire to output the document data now, the user selects a "put in output box" button arranged for each of the editing setting examples 1036-1 to 1036-3 and presses the start key, thereby putting the document data in an output box, i.e., registering the document data in a personal output document list. Because the document data is put in the output box, the document data can be output at an appropriate timing specified by the user.

If the user desires to output the document data immediately, the user can change an output destination by checking a "change output destination" checkbox arranged for each of the editing setting examples 1036-1 to 1036-3.

A "regenerate" checkbox is arranged for each of the editing setting examples 1036-1 to 1036-3 if the document data contains editing contents for the plotter output performed by a copy, a printer, or the like. The "regenerate" checkbox indicated with shading cannot be checked by the user in the editing setting example 1036-2 for fax transmission and the editing setting example 1036-3 for scanner distribution. When the "regenerate" checkbox is checked by the user, even if edited image data to be output have been stored, image data is regenerated from unedited image data displayed at the image display area 1031 in accordance with settings for the editing process. This is because an output of image data generated for the plotter output changes depending on the state of the plotter unit 9. Therefore, even if the image data that has been output during a previous output process is output without modification, the image data cannot be output in the same manner. The state of the plotter unit 9 is detected and parameters set for the γ transformation process or the color conversion process performed by the second image-data processing unit 4 is corrected based on the detection result so that an appropriate output image can be obtained. Because this correction process is performed by a conventional technique, detailed explanation is omitted. If the correction process based on the state of the plotter unit 9 is not performed in the MFP, because only the same image can be obtained by the regeneration process, the user is prevented from checking the "regenerate" checkbox.

The user can specify a page of the document upon giving an output instruction for the document data with the displayed editing contents. The user checks an "only this page" checkbox arranged for each of the editing setting examples 1036-1 to 1036-3 in order to output only the page displayed on the screen, and the user checks an "all pages" checkbox arranged for each of the editing setting examples 1036-1 to 1036-3 in order to output the whole document data including pages not displayed on the screen. The "only this page" checkbox and the "all pages" checkbox are controlled by an exclusive control method so that only one of these checkboxes can be selected at one time. The "only this page" checkbox is checked as the default state where the editing contents are displayed. It is preferable that the "only this page" checkbox can be switched to the "all pages" checkbox as the default state.

A display area for displaying editing contents is arranged for each of the editing setting examples 1036-1 to 1036-3, and a "display details" button is attached to the display area. To see detailed output or editing contents, the user selects the "display details" button, so that the user can see how editing contents are used in combination to generate image data displayed on the screen, or specify advanced settings, for example, specify a page of a document, with respect to the output process.

If a predetermined time elapses while the user does not select any of the editing setting examples 1036-1 to 1036-3, the editing setting examples 1036-1 to 1036-3 are updated to different editing setting examples with the next highest usage frequency.

In this manner, the editing setting examples are repeatedly updated and, when the editing setting example to be displayed on the screen reaches the last one, the first editing setting example is next displayed on the screen. The predetermined time that is an elapsed time during the automatic updating operation is set to be 20 seconds. Thus, if the user does not select any of the editing setting examples displayed on the screen within 20 seconds, the editing setting examples are updated.

As shown in FIG. 7, when document data is selected by the user at Step S101 and the selected document data is stored, if the document data has been output with an editing operation performed thereon, the document data is previewed at the middle area of the screen, and then it is determined whether advanced editing contents are provided by a document editing function of the MFP (Step S102).

If the advanced editing contents are provided (Yes at Step S102), the menus (the buttons 1028) of the advanced editing contents to be provided are displayed on the screen (Step S103).

Document patterns (the editing setting examples 1036-1 to 1036-3) generated by performing editing with frequently used editing contents on the selected document data are displayed on the screen in descending order of usage frequency (Step S104).

It is determined whether the displayed document patterns correspond to the specific editing content (for example, the process for combining image data and the process for saving toner) (Step S105). If it is not determined that the displayed document patterns correspond to the specific editing content (No at Step S105), the process control proceeds to Step S107. If it is determined that the displayed document patterns correspond to the specific editing content (Yes at Step S105), specific marks are attached to the document patterns (if the specific editing content is the process for combining image data or the process for saving toner, a mark that represents a tree indicating an environment-friendly editing process is attached to the document pattern) (Step S106).

It is determined whether the user selects any one of the document patterns displayed on the screen at Step S104 to be output (Step S107). Specifically, it is determined whether the user presses any one of the "output now" button or the "put in output box" button arranged for each of the editing setting examples 1036-1 to 1036-3 on the screen shown in FIG. 8.

Figure 13:
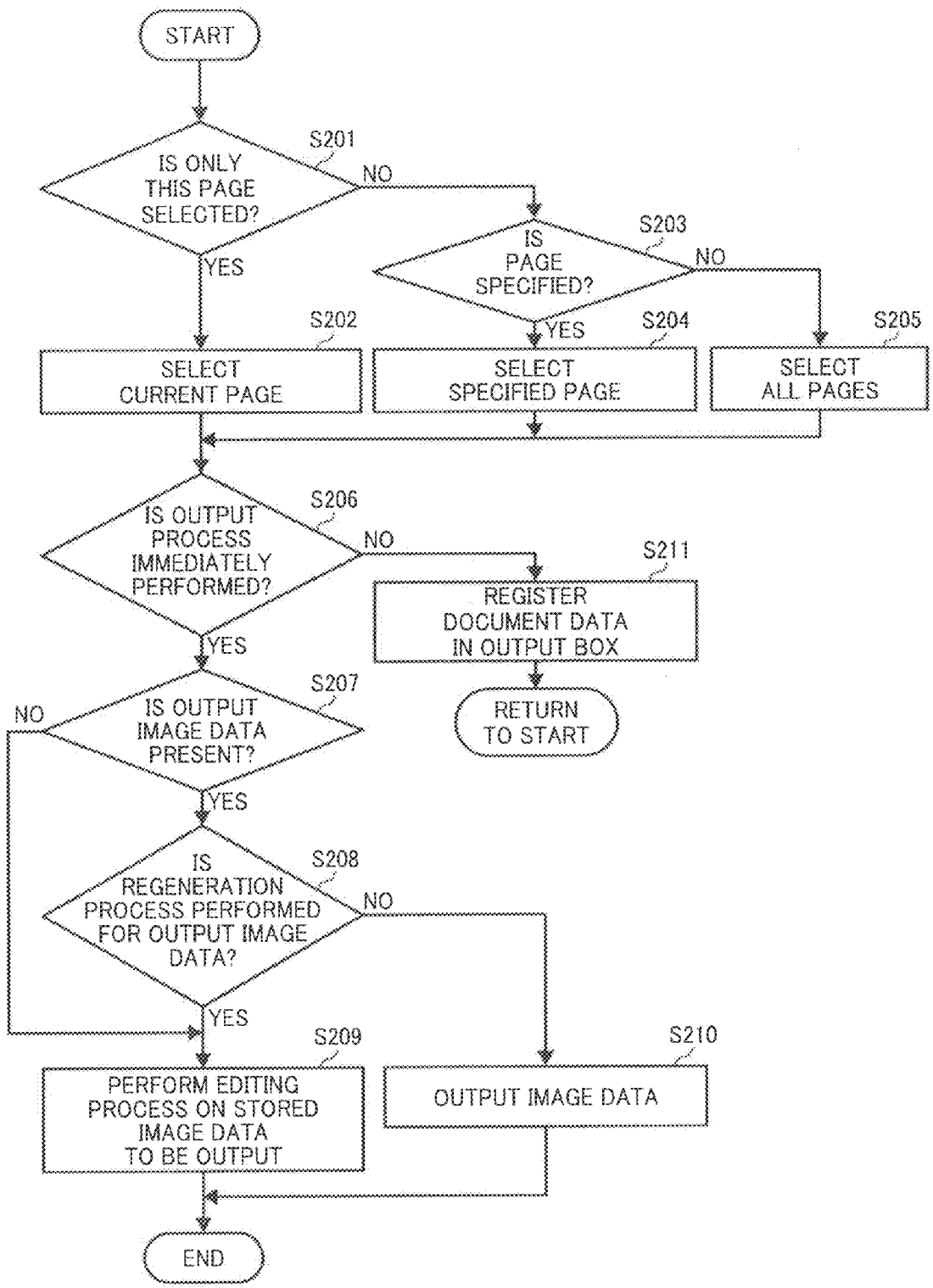
FIG. 13 is a flowchart of an output process performed by the MFP.

If the user selects any one of the displayed document patterns (Yes at Step S107), the process control proceeds to the output process shown in FIG. 13.

If the user does not select any of the displayed document patterns (No at Step S107), it is determined whether the user selects any of the menus of the advanced editing contents displayed at Step S103 within a predetermined time (Step S108).

If it is not determined that the user selects any of the menus of the advanced editing contents within the predetermined time (No at Step S108), it is assumed that the user needs time to consider whether any of the document patterns displayed at Step S104 is to be selected; therefore, the document patterns are continuously displayed on the screen. As described above, if there are more documents patterns than those that can be displayed in the display area, the document patterns to be displayed are updated at a fixed time interval, whereby all document patterns can be displayed on the screen in descending order of usage frequency.

Conversely, if it is determined that the user selects any of the menus of the advanced editing contents within the predetermined time (Yes at Step S108), the process control returns to Step S102 and it is determined whether further advanced editing contents are provided by the document editing function (Step S102). The predetermined time is set to, for example, 10 seconds after the menus are displayed on the screen, based on the assumption that the user selects one of the menus of the advanced editing contents without hesitation. If the user does not select any of the menus within the predetermined time, it is assumed that the user is considering whether any one of the document patterns is to be selected.

If it is determined that the advanced editing contents are provided by the document editing function (Yes at Step S102), menus for further advanced editing contents that can be provided by the MFP are displayed on the screen (Step S103).

Figure 9:
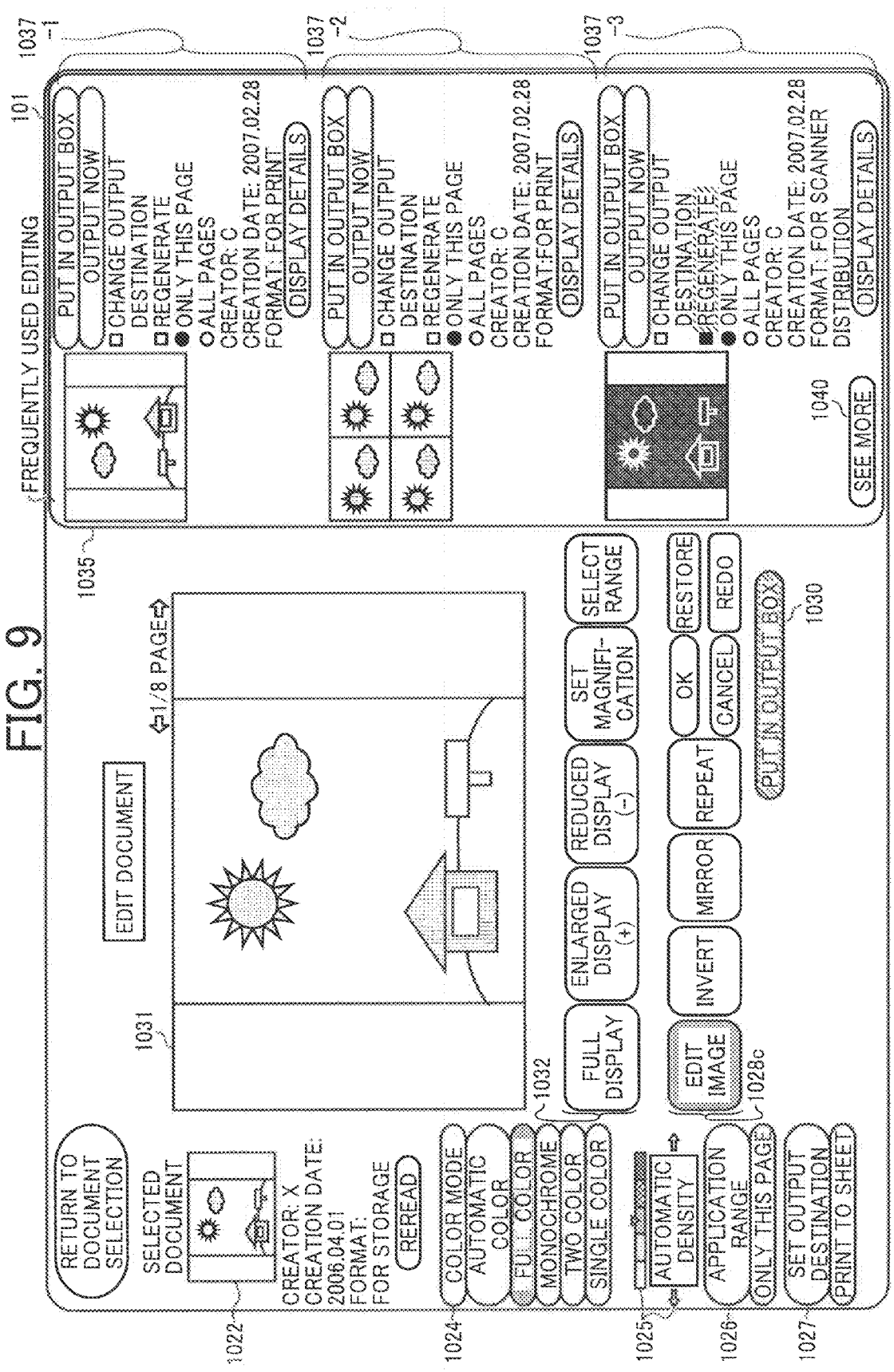
FIG. 9 is a schematic diagram of the screen when the user selects an "edit image" button displayed on the screen shown in FIG. 8.

FIG. 9 is a schematic diagram of the screen when the user selects the "edit image" button displayed on the screen shown in FIG. 8. A group of buttons 1028c including buttons for "invert" for a negative-positive inversion process, "mirror" for a mirror process, and "repeat" for a repeat process are displayed on the screen as menus of the advanced editing contents.

Three image editing examples 1037-1, 1037-2, and 1037-3 are displayed on the right of the "edit document" screen shown in FIG. 9. The image editing examples 1037-1, 1037-2, and 1037-3 are generated by performing the editing contents selected from the image editing menus on target document data (the image data previewed at the image display area 1031) and displayed in descending order of usage frequency from the top of the screen. The image editing example 1037-1 is generated by the mirror process, the image editing example 1037-2 is generated by the repeat process, and the image editing example 1037-3 is generated by the negative-positive inversion process. If the user finds an image editing example with desired editing contents, the user can output the image editing example without giving any instruction for editing.

Although the number of editing contents that can be displayed on the screen at one time is limited, if the user desires to see more image editing examples, the user selects the "see more" button 1040, so that other image editing examples with frequently used editing contents are displayed on the screen.

Figure 10:
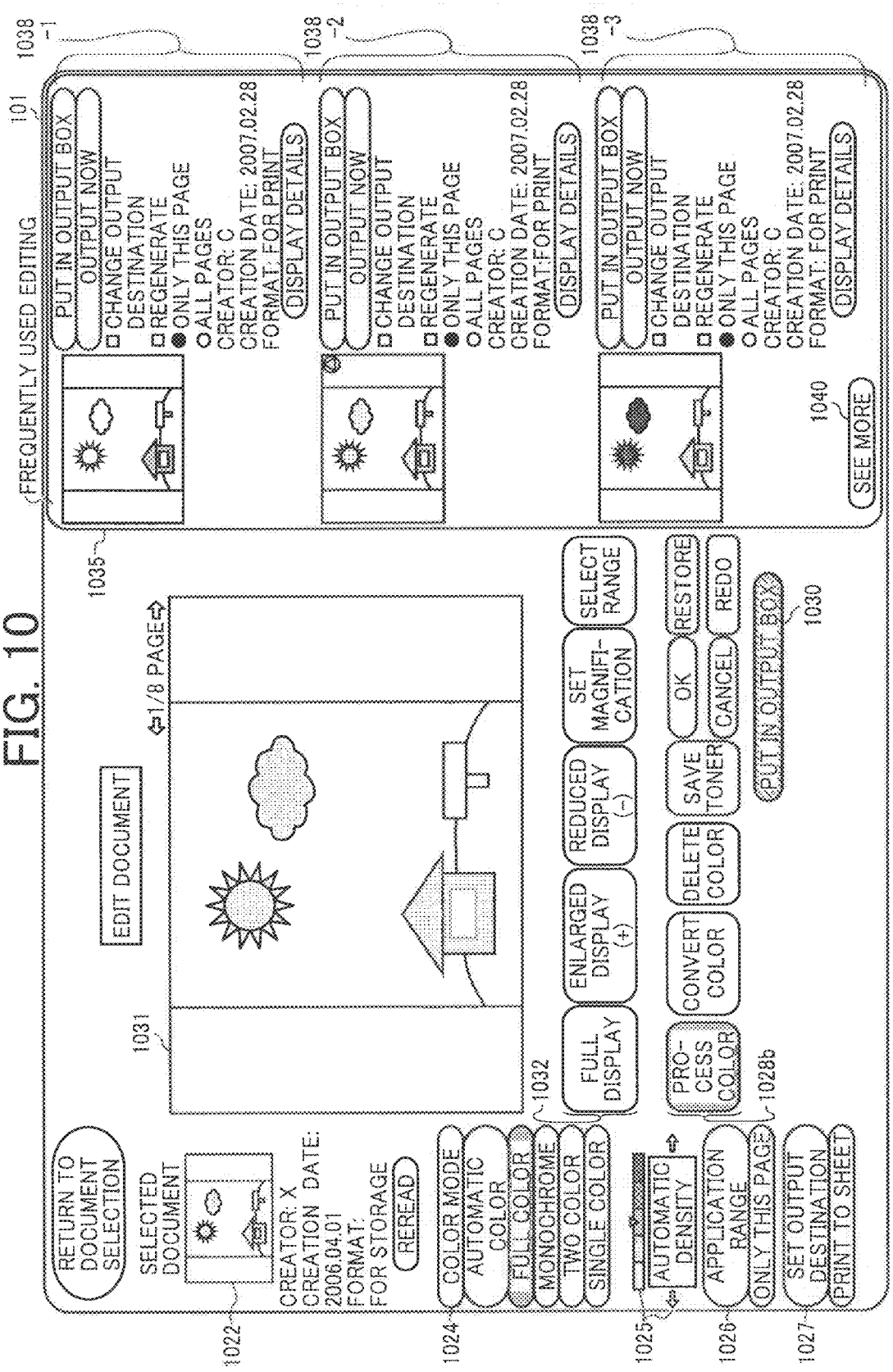
FIG. 10 is a schematic diagram of the screen when the user selects a "process color" button displayed on the screen shown in FIG. 8.

FIG. 10 is a schematic diagram of the screen when the user selects the "process color" button as the editing menu displayed on the screen shown in FIG. 8. A group of buttons 1028b including buttons for "convert color" for a color conversion process, "delete color" for a color delete process, and "save toner" for a toner save process are arranged on the screen as menus of the advanced editing contents.

Three color conversion examples 1038-1, 1038-2, and 1038-3 are displayed on the right side of the "edit document" screen shown in FIG. 10. The color conversion examples 1038-1, 1038-2, and 1038-3 are generated by performing the editing contents selected from the color conversion menu on target document data (the image data previewed at the image display area 1031) and displayed in descending order of usage frequency from the top of the screen. The color conversion example 1038-1 is generated by the color delete process, the color conversion example 1038-2 is generated by the toner save process, and the color conversion example 1038-3 is generated by the color conversion process. If the user finds a color conversion example with desired editing contents, the user can output the color conversion example without giving any instructions for editing. A specific mark indicating environmental friendliness is displayed at the upper right of the color conversion example 1038-2 on which the toner save process has been performed.

Although the number of editing contents that can be displayed on the screen at one time is limited, if the user desires to see more color conversion examples, the user selects the "see more" button 1040, so that other color conversion examples with frequently used editing contents are displayed on the screen.

Figure 11:
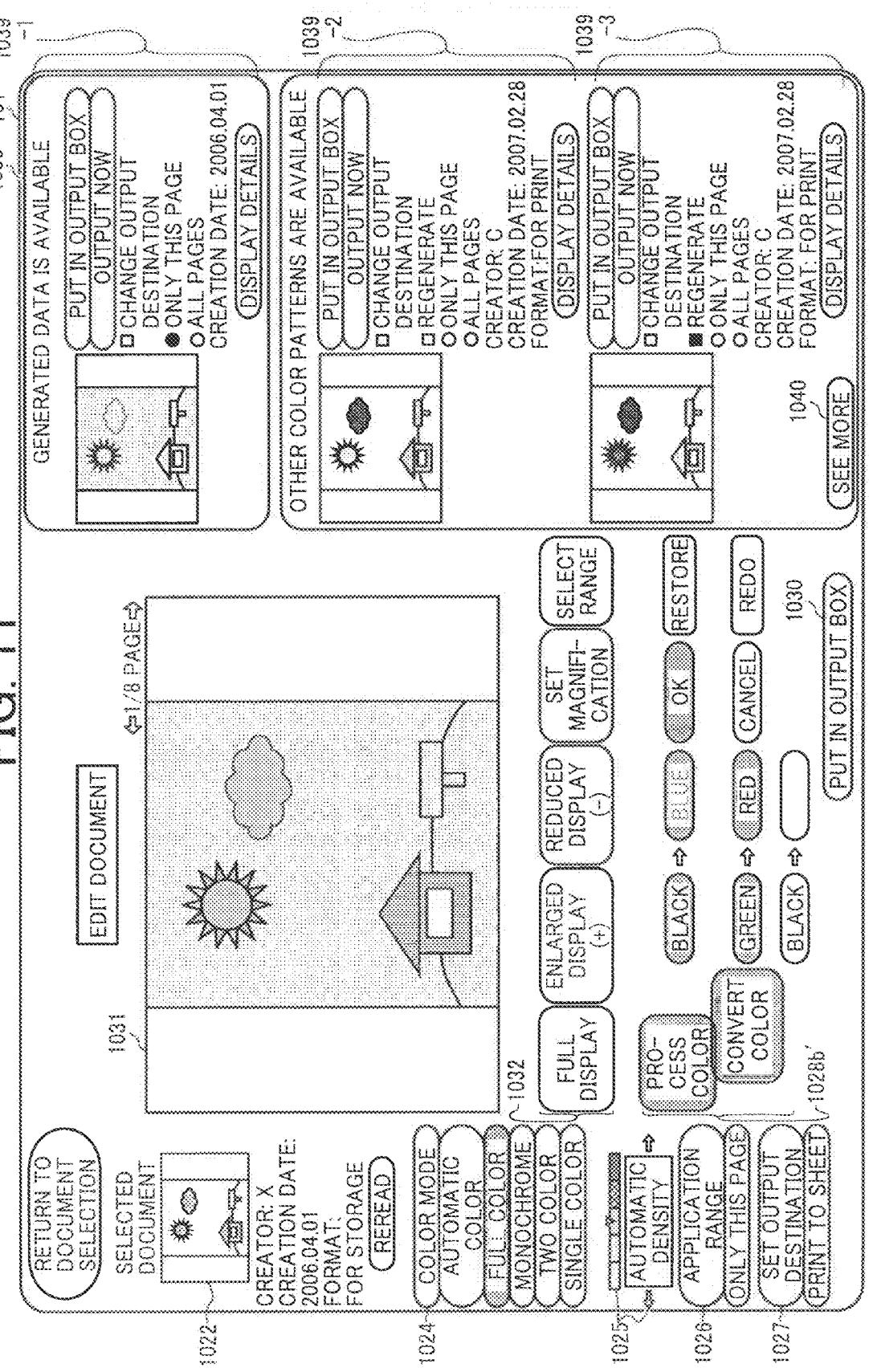
FIG. 11 is a schematic diagram of the screen when the user selects a "convert color" button displayed on the screen shown in FIG. 10.

FIG. 11 is a schematic diagram of the screen when the user selects the "convert color" button as the editing menu displayed on the screen shown in FIG. 10. A group of buttons 1028b' including buttons for processes of converting "black" to "blue" and from "green" to "red" are arranged on the screen as menus of the advanced editing contents of the color conversion process. The user selects an "OK" button included in the buttons 1028b', so that the user can order the color conversion process based on the settings specified by the user.

Document data generated by performing the editing contents selected from the color conversion menu on target document data (the image data previewed in the image display area 1031) is displayed on the right side of the "edit document" screen shown in FIG. 11.

In the example shown in FIG. 11, the user orders the color conversion from "black" to "blue" and from "green" to "red" and, because menus of further advanced editing contents are not provided, if image data edited based on the same condition as specified by the user has been stored as stored image data, the edited image data is displayed in a display area 1035', where a message "generated data is available" is shown on the screen. Thus, the user can be notified that the edited image data can be output immediately without performing image processing including the editing process on the unedited stored image data. If the image data can be output without modification, the processing time can be shortened as well as electric power consumption reduced, resulting in environmental friendliness. As shown in a color-conversion setting field 1039-1 of the display area 1035', although the user cannot change the editing (color conversion) contents again, the user can specify a page number to be output. Because it is sufficient to notify the user that the image data edited based on the same condition as specified by the user is available, a thumbnail smaller than other displayed contents is displayed on the screen. It is possible that the thumbnail is omitted and its space is used for other contents.

Furthermore, color conversion examples on which editing contents with slightly different conditions are performed are displayed in a display area 1035 with a message indicating that "other color patterns are available", separately from the image data edited in accordance with the user's instruction. The editing contents based on color patterns generated by the color conversion different from that selected by the user are displayed with high priority in the display area 1035. Thus, the user can see color effects based on the color patterns different from those selected by the user, and even if the user does not select the editing contents displayed in the display area 1035, it makes it easier for the user to get a new idea about the color conversion process. If there are a number of editing contents based on different color patterns, priorities are set to the editing contents based on usage frequency. Color conversion examples 1039-2 and 1039-3 are displayed on the screen shown in FIG. 11. Although the number of editing contents that can be displayed on the screen at one time is limited, if the user desires to see more color conversion examples, the user selects the "see more" button 1040 so that other color conversion examples with frequently used editing contents are displayed on the screen.

The user gives an instruction to complete the editing process, or selects the "output now" button attached to editing contents (the color conversion examples 1039-2, 1039-3, and the like) displayed by the system and presses the start key (FIG. 6), whereby the output process is performed. At this time, if the user desires to output document data immediately, the user presses the start key. However, if the user desires to output the document data together with different document data later instead of outputting the document data immediately, the user selects a "put in output box" button 1030 located at the lower middle position of the screen in order to only register the document data in the output box so that the user can output the document data all together to a desired output destination later. The "put in output box" button 1030 cannot be selected on the screens shown in FIGS. 8 to 10 and is selectable when further advanced editing contents are not provided.

As shown in FIG. 7, after the loop from Steps S102 to S108, if further advanced editing contents are provided (Yes at Step S102), menus of the further advanced editing contents that can be provided by the MFP are displayed on the screen in accordance with the user's instruction (Step S103). The above process is performed such that the editing contents (document patterns) performed on target document data are displayed on the screen that is switched from the one shown in FIG. 8 (document editing) to the one shown in FIG. 10 (color process) and from the one shown in FIG. 10 to the one shown in FIG. 11 (color conversion). Then, any of the displayed advanced editing contents are selected, and the setting process is performed for the selected advanced editing content.

In this manner, when the display of the advanced editing contents is completed, if any of the displayed document patterns are not selected by the user (No at Step S107) and the "OK" button included in the buttons for the menus of the last advanced editing contents is selected (Yes at Step S108), no more advanced editing contents to be displayed in accordance with the menu are provided (No at Step S102). If the MFP does not have the editing function, it is determined whether no more advanced editing contents are provided immediately after the start of the operation shown in FIG. 7.

If no more advanced editing contents to be displayed in accordance with the menu are provided, it is determined whether edited image data with the same editing contents as instructed by the user is stored as stored image data (Step S111), and if it is determined that the edited image data is present (Yes at Step S111), the user is notified that the image data is present, and the edited image data is displayed on the screen separately from other editing contents (Step S112). The edited image data is displayed in the display area 1035', as shown in FIG. 11. Thus, the user can be notified that the edited image data can be output immediately without performing image processing including the editing process on the unedited stored image data.

If it is not determined that the edited image data is present (No at Step S111), the process control proceeds to Step S113.

After the display of the editing contents in accordance with the user's instruction is finished, the editing contents with conditions slightly different from selected conditions are displayed (Step S113). In the example of the color conversion process, although the color pattern generated by the color conversion selected by the user is provided (displayed in the display area 1035'), color conversion examples with different editing contents are displayed. The color conversion examples with the different editing contents are displayed in the display area 1035 next to the display area 1035' so that the user can see the color conversion examples.

It is determined whether the user selects any one of the document patterns displayed by the system at Step S113 as output document data (Step S114). Specifically, it is determined whether the user presses any one of the "output now" buttons and the "put in output box" buttons arranged for the color conversion examples 1039-2 and 1039-3 displayed by the system on the screen shown in FIG. 11.

If it is determined that the user selects any one of the displayed document patterns (Yes at Step S114), the process control proceeds to the output process shown in FIG. 13.

If it is not determined that the user selects any one of the displayed document patterns (No at Step S114), it is determined whether an editing instruction received from the user is terminated (Step S115).

For example, in the color conversion process, if the user presses any of the "output now" button and the "put in output box" button arranged for the editing contents displayed based on the color pattern (displayed as the generated data) by the color conversion process specified by the user (Yes at Step S115), it is determined that the editing instruction is terminated. In such a case, the process control proceeds to the output process shown in FIG. 13.

If the user presses a "restore" button or a "redo" button included in the buttons 1028b' on the screen for the menus of the last advanced editing contents of the color conversion process, it cannot be determined that the editing instruction is terminated. In such a case, the process control proceeds to Step S102.

Figure 12:
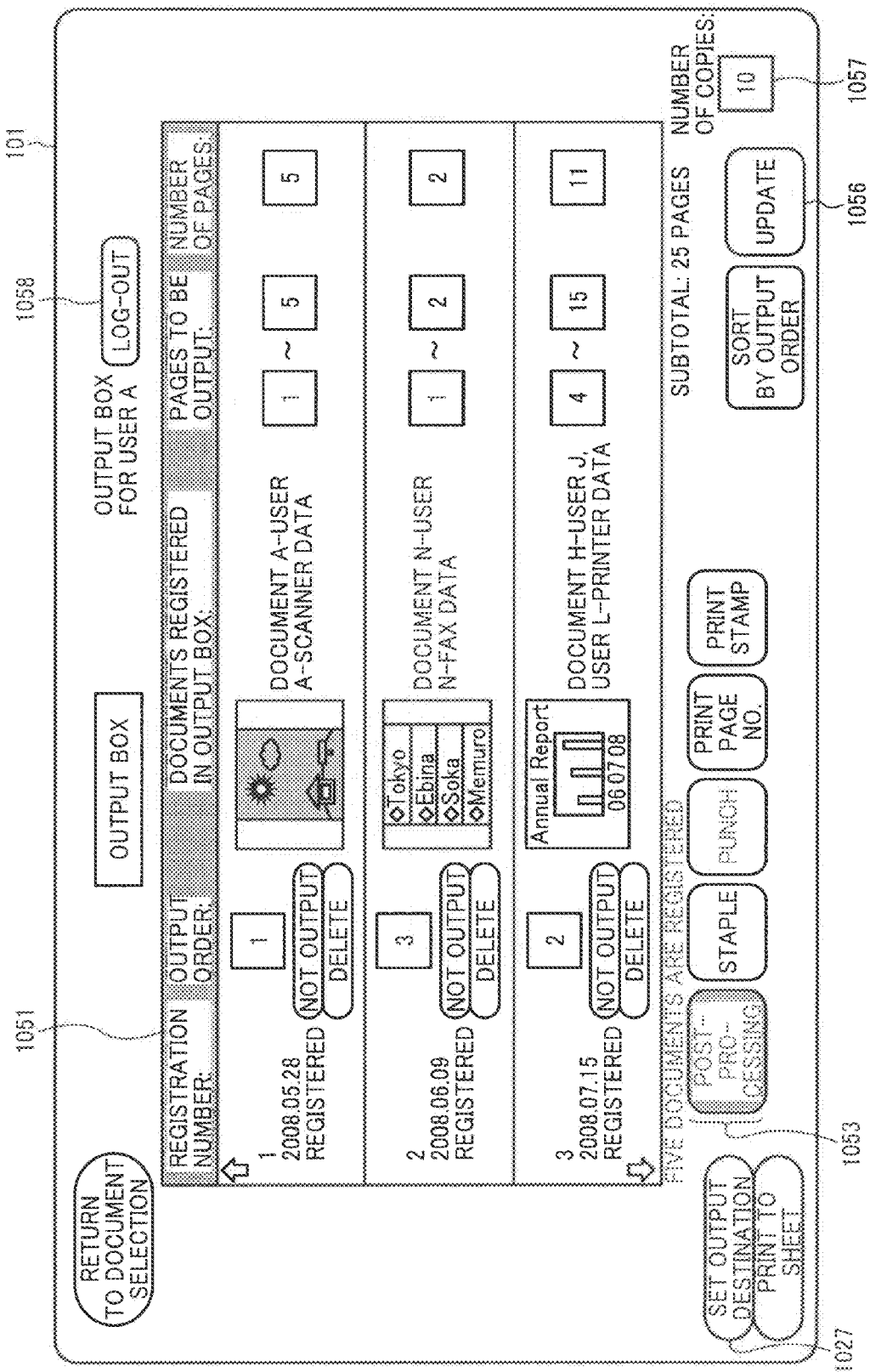
FIG. 12 is a schematic diagram of the screen displayed when the user operates "output box" provided by the document box function.

FIG. 12 is a schematic diagram of the screen displayed when the user operates the "output box" provided by the document box function. The screen is displayed when a user A logs on upon using the document box function and selects an output box for the user A from the menu screen. A message indicating that "output box for user A" is selected is displayed at the upper right of the screen.

A "log-out" button 1058 is displayed next to the message "output box for user A". The user can terminate authentication while the output box is maintained at the operating condition. Although a personal output box cannot be used unless the user is authenticated, an administrator allows usage of a guest output box for which authentication is not necessary. Therefore, the user can switch the personal output box to the guest output box by selecting the "log-out" button 1058.

Registered document data (registered by selecting the "put in output box" button as described above) is displayed in a display area 1051 arranged in the middle area of the "output box" screen, and the registered document data is managed by using serial register numbers (1, 2, 3, . . . ). Information about the registered document data, such as a registration date when the document data is registered in the output box ("2008.05.28 registered", "2008.06.09 registered", . . . ), a document name (document A, document N, . . . ), a creator (user A, user N, . . . ), an output destination (scanner, fax, . . . ), pages to be output ("1" to "5", "1" to "2", . . . ), the number of pages ("5", "2", . . . ) an output order ("1", "3", "2", . . . ), and the like, are displayed with thumbnail image data.

The output order and the pages to be output can be changed within the output box, and if the user has changed the output order or the pages to be output, the user selects an "update" button 1056 located on the lower right of the screen, whereby the changes are reflected on the displayed screen.

Editing menus used to perform post-editing on all document data registered in the output box together are arranged in a display area located at the bottom of the screen. A group of buttons 1053 arranged in the display area includes a "staple" button for stapling the registered document data all together in an output order, a "punch" button for punching the registered document data all together in an output order, a "print page No." button for assigning a page number throughout the whole document data, and a "print stamp" button for printing a registry stamp on each page.

The user can specify how many copies of the document data combined all together to be output by entering desired numbers in a copy number box 1057 located on the lower right of the screen using the numeric keypad of the operation display unit 10.

Document data registered in the output box is not necessarily output. If the user determines that document data registered in the output box is unnecessary, the user selects a "delete" button arranged for each registered document data displayed in the display area 1051 and then selects the "update" button 1056, thereby deleting the document data from the output box. If the user determines that registered document data is unnecessary only for the current output process, the user selects a "not output" button arranged for each registered document data displayed in the display area 1051, whereby the document data can be separated from target document data for the current output process although the document still remains in the output box.

Because the output process of image data registered in the output box is not performed in synchronization with a registration process of the image data in the output box, image processing including the editing process can be performed on the image data in synchronized timing with an output instruction received from the user via the "output box" screen. However, because a time lag occurs between registration timing and output timing, it is possible to perform the image processing in advance in consideration of system load between the registration of the image data and the output instruction via the output box. In this processing method, if the user gives instructions for post-editing via the "output box" screen again, image data is regenerated at that time.

FIG. 13 is a flowchart of the output process performed by the MFP.

When target image (document) data is to be output after the setting process for editing, the user can specify all the pages or each page of document data. Specifically, the user selects the "application range" button 1026 shown in FIGS. 8 to 11 so that the user can specify a page by using the pull-down menus (the menus for "only this page", "specify page", and "all pages") with respect to an output of the editing contents set in accordance with the user's instruction, or by checking the "only this page" checkbox or the "all pages" checkbox with respect to an output of a document pattern displayed by the system as setting examples of the editing contents in the display area 1035.

Thus, a procedure corresponding to an instruction for the application range is performed.

As shown in FIG. 13, it is determined whether the "only this page" checkbox is checked by the user (Step S201), and if it is determined that the "only this page" checkbox is checked by the user (Yes at Step S201), the current page displayed on the screen is selected as a target for the output process (Step S202).

If it is not determined that the "only this page" checkbox is checked by the user (No at Step S201), it is determined whether the "specify page" checkbox is checked (Step S203). If it is determined that the "specify page" checkbox is checked (Yes at Step S203), a specified page is selected as a target for the output process (Step S204).

If it is not determined that the "specify page" checkbox is checked (No at Step S203), it is determined that the "all pages" checkbox is checked (Step S205). In this manner, it is determined that a selected range corresponds to "only this page", "specify page", or "all pages" in response to the user's instruction, and the selected range is set as an operation condition for the output process.

It is then determined whether the output process is to be immediately performed (Step S206). If the user selects the "output now" button displayed in the display area 1035 or the display area 1035' on the screens shown in FIGS. 8 to 11, it is determined that the output process is to be immediately performed (Yes at Step S206). If the user selects the "put in output box" button displayed in the display area 1035 or located at the lower bottom of the screen shown in FIG. 11, it is determined that the output process is not to be immediately performed (No at Step S206).

If the user selects the "put in output box" button (No at Step S206), the document data is registered in the output box (see the explanation described with reference to FIG. 12) (Step S211), and then the process control returns to the start of the operation shown in FIG. 7.

If the user selects the "output now" button (Yes at Step S206), it is determined whether output image data is present (Step S207).

Even if the output image data is present, there are two cases: one case is where the stored document data (the document data displayed in the display area 1035') can be used without modification, and the other case is where the stored document data (the document data displayed in the display area 1035 shown in FIGS. 8 to 11 for which the "regenerate" checkbox is checked) needs to be regenerated.

If it is determined that the output image data is present (Yes at Step S207), it is determined whether the regeneration process needs to be performed to obtain the output image data (Step S208). If the regeneration process does not need to be performed because the stored document data can be used without modification (No at Step S208), the stored document data is immediately output as the output image data (Step S210).

Even if it is determined that the output image data is present (Yes at Step S207), the regeneration process needs to be performed in the case of the plotter output. If the regeneration process needs to be performed (Yes at Step S208), the editing process is performed on the stored document data in accordance with characteristics of the plotter unit 9 to regenerate the stored document data, and the regenerated document data is output (Step S209).

If it is determined that the output image data is not present (No at Step S207), the editing process is performed on the stored document data to be output as the output image data (Step S209).

After the output process is performed, the operation shown in FIG. 13 ends.

According to an aspect of the present invention, even if a user is not used to giving instructions for an output process, the user can give instructions for a process for generating appropriate output image data to meet the user's intention based on a wide range of variations of processing contents.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an image receiving unit configured to receive input image data;
   an image processing unit configured to process the input image data thereby generating processed image data;
   an image storage unit configured to store therein the input image data and the processed image data;
   a usage-log managing unit configured to manage usage log information about the processed image data;
   an operation display unit that has a graphical user interface (GUI) function and configured to receive an input of a processing request for processing input image data to generate processed image data; and
   a control unit configured to control each unit of the image processing apparatus, including the image receiving unit, the image processing unit, the image storage unit, the usage-log managing unit, and the operation display unit, thereby controlling the overall image processing apparatus based on the processing request, wherein
   the usage-log managing unit manages processing contents that have been used by the image processing unit when generating the processed image data in association with the processed image data as the usage log information,
   when the operation display unit receives a request for an output process of the processed image data, the control unit acquires a processing content of the output process from the usage log information depending on the output process and displays processing content information about acquired processing content in association with image data processed based on the acquired processing content on the operation display unit,
   when image data stored in the image storage unit during a previous output process is present as processed image data processed based on the acquired processing content, the control unit uses the image data stored in the image storage unit, and
   when a processing content instructed by the request is same as a processing content acquired from the usage log information and when image data processed based on the processing content is stored in the image storage unit, the control unit controls the image processing unit to perform processing on original image data based on the processing content again to obtain processed image data and displays the processed image data.

2. The image processing apparatus according to claim 1, wherein the control unit acquires a processing content that is partially different from a processing content instructed by the request from the usage log information.

3. The image processing apparatus according to claim 2, wherein when the control unit is to acquire the processing content that is partially different from the processing content instructed by the request from the usage log information, the control unit puts priority on a frequently used processing content.

4. The image processing apparatus according to claim 2, wherein the control unit includes a registration unit in which a specific processing content is registered in advance, and when a processing content acquired from the usage log information corresponds to registered specific processing content, the control unit displays acquired processing content in a highlighted manner.

5. The image processing apparatus according to claim 1, wherein the control unit acquires only same processing content as a processing content instructed by the request from the usage log information.

6. The image processing apparatus according to claim 1, wherein the control unit represents a processing content that is acquired from the usage log information and is same as a processing content instructed by the request and a processing content that is acquired from the usage log information and is partially different from a processing content instructed by the request in different manners.

7. The image processing apparatus according to claim 2, wherein the control unit represents a processing content that is acquired from the usage log information and is same as a processing content instructed by the request and a processing content that is acquired from the usage log information and is partially different from a processing content instructed by the request in different manners.

8. The image processing apparatus according to claim 5, wherein the control unit represents a processing content that is acquired from the usage log information and is same as a processing content instructed by the request and a processing content that is acquired from the usage log information and is partially different from a processing content instructed by the request in different manners.

9. The image processing apparatus according to claim 1, wherein when number of processing contents acquired by the control unit is larger than number of processing contents that can be displayed on a display screen of the operation display unit, when the operation display unit does not receive an operation for processing contents displayed on the display screen within a predetermined time, the control unit updates the processing contents displayed on the display screen.

10. An image processing method implemented on an image forming apparatus including
    an image receiving unit configured to receive input image data;
    an image processing unit configured to process the input image data thereby generating processed image data;
    an image storage unit configured to store therein the input image data and the processed image data;
    a usage-log managing unit configured to manage usage log information about the processed image data;
    an operation display unit that has a graphical user interface (GUI) function and configured to receive an input of a processing request for processing input image data to generate processed image data; and
    a control unit configured to control each unit of the image processing apparatus, including the image receiving unit, the image processing unit, the image storage unit, the usage-log managing unit, and the operation display unit, thereby controlling the overall image processing apparatus based on the processing request, wherein
    the usage-log managing unit manages processing contents that have been used by the image processing unit when generating the processed image data in association with the processed image data as the usage log information,
    wherein the image processing method comprising:
    receiving a request for an output process of the processed image data via the operation display unit;
    acquiring a processing content of the output process from the usage log information depending on the output process; and displaying processing content information about acquired processing content in association with image data processed based on the acquired processing content on the operation display unit, wherein the displaying includes using the image data stored in the image storage unit when image data stored in the image storage unit during a previous output process is present as processed image data processed based on the acquired processing content, and when a processing content instructed by the request is same as a processing content acquired at the acquiring from the usage log information and when image data processed based on the processing content is stored in the image storage unit, the image processing unit is controlled to perform processing on original image data based on the processing content again to obtain processed image data and displays the processed image data.

11. The image processing method according to claim 10, wherein the acquiring includes acquiring a processing content that is partially different from a processing content instructed by the request from the usage log information.

12. The image processing method according to claim 11, wherein when the processing content that is partially different from the processing content instructed by the request are to be acquired at the acquiring from the usage log information, the acquiring includes putting priority on a frequently used processing content.

13. The image processing method according to claim 11, further comprising registering a specific processing content in advance, wherein when a processing content acquired at the acquiring from the usage log information corresponds to registered specific processing content, the acquiring includes displaying acquired processing content in a highlighted manner.

14. The image processing method according to claim 10, wherein the acquiring includes acquiring only same processing content as a processing content instructed by the request from the usage log information.

* * * * *